US011999434B2

(12) United States Patent
Raffaelli

(10) Patent No.: US 11,999,434 B2
(45) Date of Patent: Jun. 4, 2024

(54) MOTOR VEHICLE WITH A SUSPENSION USING A WATT FOUR-BAR LINKAGE

(71) Applicant: PIAGGIO & C. S.P.A., Pontedera (IT)

(72) Inventor: Andrea Raffaelli, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 216 days.

(21) Appl. No.: 17/641,266

(22) PCT Filed: Sep. 4, 2020

(86) PCT No.: PCT/IB2020/058233
§ 371 (c)(1),
(2) Date: Mar. 8, 2022

(87) PCT Pub. No.: WO2021/048715
PCT Pub. Date: Mar. 18, 2021

(65) Prior Publication Data
US 2022/0281550 A1 Sep. 8, 2022

(30) Foreign Application Priority Data
Sep. 9, 2019 (IT) .......................... 102019000015905

(51) Int. Cl.
B62K 25/16 (2006.01)
B62K 21/02 (2006.01)

(52) U.S. Cl.
CPC .............. B62K 25/16 (2013.01); B62K 21/02 (2013.01)

(58) Field of Classification Search
CPC ..................................................... B62K 25/16
See application file for complete search history.

(56) References Cited

U.S. PATENT DOCUMENTS

| 3,174,771 | A | | 3/1965 | Müller | |
| 3,573,882 | A | * | 4/1971 | Van Winsen | B60G 3/185 |
| | | | | | 280/124.105 |
| 6,789,810 | B2 | * | 9/2004 | Strong | B60G 3/14 |
| | | | | | 280/124.128 |
| 2013/0161925 | A1 | * | 6/2013 | Lavabre | B62K 25/24 |
| | | | | | 280/279 |
| 2022/0281551 | A1 | * | 9/2022 | Raffaelli | B62K 25/005 |
| 2022/0396332 | A1 | * | 12/2022 | Raffaelli | B60G 15/067 |

FOREIGN PATENT DOCUMENTS

| CN | 200988406 Y | 12/2007 |
| DE | 4444078 A1 | 6/1996 |
| DE | 102009059029 A1 | 6/2011 |
| EP | 2595868 A1 | 5/2013 |
| EP | 2595868 B1 | 7/2015 |
| FR | 1273251 A | 10/1961 |
| JP | 2007296983 A | 11/2007 |
| JP | 2018020653 A | 2/2018 |
| JP | 2018538194 A | 12/2018 |

* cited by examiner

*Primary Examiner* — Kevin Hurley
*Assistant Examiner* — Hosam Shabara
(74) *Attorney, Agent, or Firm* — McGlew and Tuttle, P.C.

(57) ABSTRACT

The saddle-riding motor vehicle (1; 107; 207) comprises a rear driving wheel (5; 105; 205) and a front steered wheel (7; 107; 207). The front steered wheel (7; 107; 207X, 207Y) is connected to a rotatable arm (9; 109; 209X, 209Y) provided with a rotary motion about a steering axis (A-A). A wheel support (37; 137) is connected to the rotatable arm (9; 109; 209) with the interposition of a suspension (17; 117; 217X, 217Y) comprising a shock absorber (22; 122). The suspension (17; 117) comprises a Watt four-bar linkage.

20 Claims, 21 Drawing Sheets

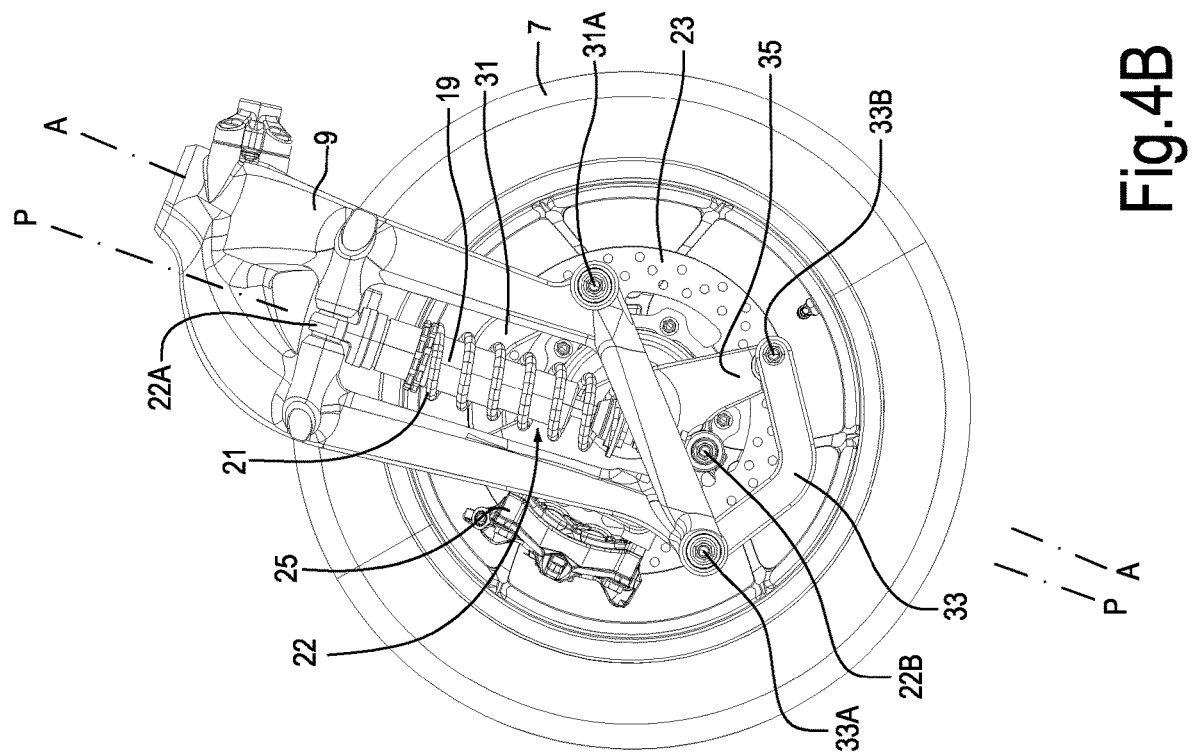
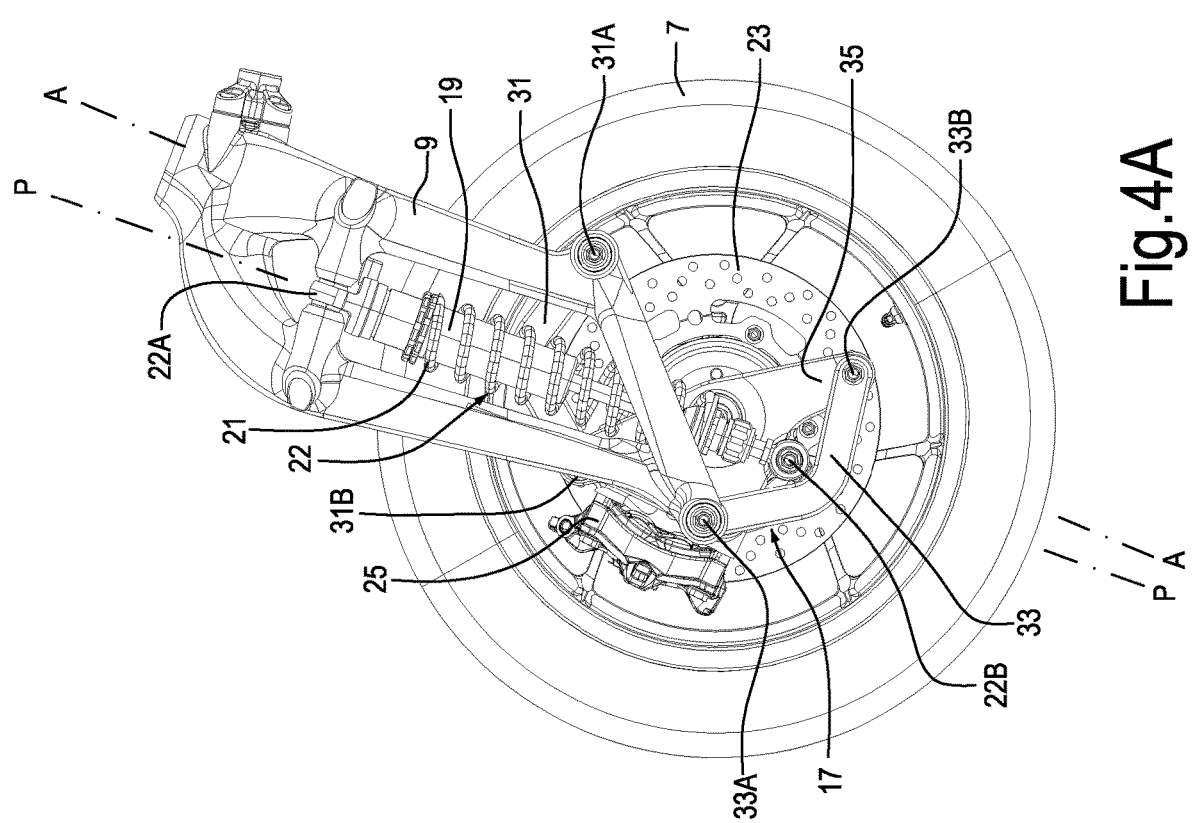

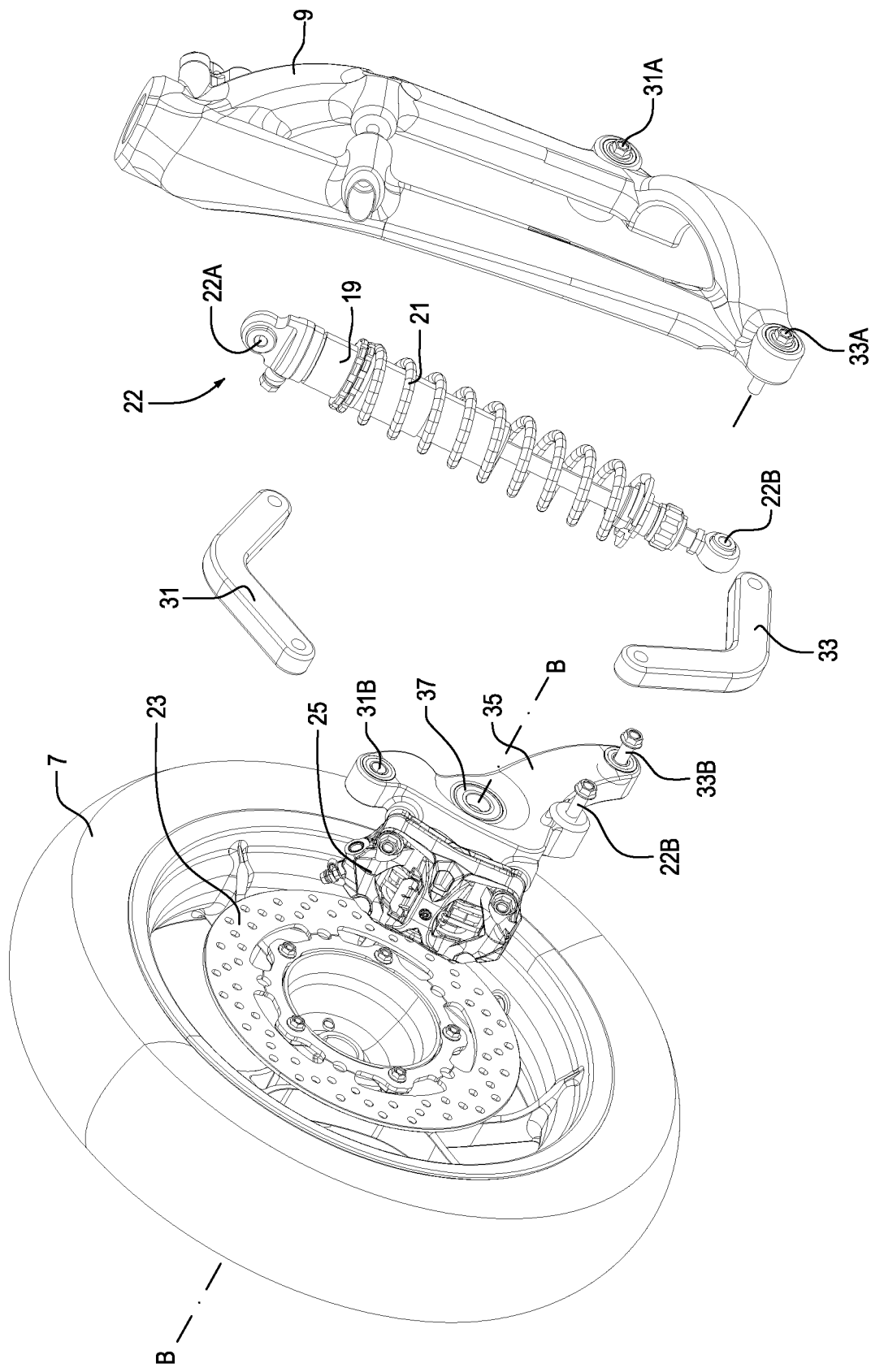

MOTOR VEHICLE WITH A SUSPENSION USING A WATT FOUR-BAR LINKAGE

TECHNICAL FIELD

The invention relates to improvements to saddle-riding vehicles with two, three or four wheels. More in particular, the invention relates to improvements to the front suspensions of a saddle-riding motor vehicle of tilting type, with one or two rear driving wheels and one or two front steered wheels, such as two- or three-wheeled motorcycles, two- or three-wheeled scooters, quad bikes or the like.

BACKGROUND ART

Saddle-riding motor vehicles with two, three or four wheels typically have one or two rear driving wheels, connected to the frame of the motor vehicle by means of rear suspensions thereof, and one or two front steered wheels, connected to a handlebar and equipped with respective front suspensions. The suspensions connect the sprung masses to the unsprung masses of the motor vehicle and allow relative movement between sprung and unsprung masses. The suspensions are usually shock absorbing suspensions, and comprise a respective shock absorber, in turn comprising an elastic member, typically a spring, and a brake or damper. The suspensions further comprise mechanical members that connect the sprung masses to the unsprung masses with possibility of relative movement between them, so that the shocks transmitted by the roughness or unevenness of the ground to the wheels are not transmitted, or are transmitted in a damped manner, to the frame of the vehicle.

In saddle-riding vehicles, such as motorcycles, scooters, QUAD bikes or the like, the suspensions of the front steered wheels allow the relative movement between the handlebar and the steering column on the one side and the front steered wheel or wheels on the other. Some suspensions of front steered wheels of saddle-riding motor vehicles use telescopic forks with members that slide inside one another to allow the aforesaid relative movement. Telescopic forks use cylindrical pairs, which have mutually sliding members; these forks therefore have some problems typical of this type of relative motion. Vice versa, other types of suspensions use revolute pairs, which have mutually rotating members. In this case, a four-bar linkage, typically four-bar linkage, is interposed between sprung mass and unsprung mass, and is deformed to allow the springing movement between sprung mass (frame of the vehicle and members connected thereto) and unsprung mass (wheels, brakes). The revolute pairs are represented by the hinges that join the components of the four-bar linkage to one another.

Suspensions that use kinematic mechanisms with revolute pairs for connection between sprung mass and unsprung mass have the advantages of revolute pairs with respect to prismatic pairs and to cylindrical pairs, but do not allow a rectilinear movement of the axis of the front steered wheel. In fact, in the springing movement, when the suspension compresses and extends, for example, due to unevenness of the ground, or during braking caused by dynamic forces that are generated on the frame and that are transmitted to the wheels through the suspension, the axle of the wheel carries out a non-rectilinear movement with consequent transverse rubbing movement of the wheel on the ground, which can for example lead to problems of bouncing.

Therefore, it would be beneficial to provide a suspension for front steered wheels of saddle-riding motor vehicles, with two or more wheels, that allow the advantages of a telescopic fork suspension to be combined with the advantages of suspensions using kinematic mechanisms with revolute pairs.

SUMMARY OF THE INVENTION

According to one aspect, disclosed herein is a saddle-riding motor vehicle with at least one rear driving wheel and at least one first front steered wheel, which is connected to a rotatable arm provided with a rotary motion about a steering axis. A wheel support is connected to the rotatable arm with the interposition of a suspension that connects the wheel support and the wheel mounted thereon to the rotatable arm. The suspension comprises a shock absorber. The wheel support supports the front steered wheel and defines a rotation axis of said wheel. For example, a wheel mounting axle can be fixed to the wheel support, or the wheel support can have a support bearing for a wheel axle. Characteristically, the suspension comprises a Watt four-bar linkage, also known as Watt mechanism.

In advantageous embodiments, the wheel support is constrained to the connecting rod in such a manner that the rotation axis of the wheel is parallel to axes of the first hinge and of the second hinge of the first crank, and of the first hinge and of the second hinge of the second crank.

In this case, the components of the Watt four-bar linkage move on respective planes orthogonal to the rotation axis of the front steered wheel. By schematizing these elements as one-dimensional elements, they lie on a plane orthogonal to the rotation axis of the front steered wheel.

In this case, the wheel support can be rigidly connected to the connecting rod and form a housing for a support bearing of the front steered wheel.

To obtain a particularly compact configuration of the suspension, in some advantageous embodiments the first hinge of the first crank and the second hinge of the second crank are on a first side of a plane containing the rotation axis of the front steered wheel and passing through a constraint point of the shock absorber to the rotatable arm. Vice versa, the second hinge of the first crank and the first hinge of the second crank are on a second side of said plane. In practice, the plane defined above divides the space into a first half-space, containing the first hinge of the first crank and the second hinge of the second crank, and into a second half-plane containing the second hinge of the first crank and the first hinge of the second crank.

In practice, with respect to the advancement direction of the vehicle, the first hinge of the first crank and the second hinge of the second crank are in a backward position, while the second hinge of the first crank and the first hinge of the second crank are in a forward position.

Alternatively, with respect to the advancement direction of the vehicle, the first hinge of the first crank and the second hinge of the second crank are in a forward position, while the second hinge of the first crank and the first hinge of the second crank are in a backward position.

In other embodiments, the first hinge and the second hinge of the first crank, and the first hinge and the second hinge of the second crank have axes substantially parallel to each other and orthogonal to a plane containing the rotation axis of the front steered wheel. In practice, each element of the Watt four-bar linkage in this case moves on a respective plane parallel to the rotation axis of the front steered wheel, and the movement planes of the components of the Watt four-bar linkage are parallel to each other.

To obtain a particularly compact configuration of the Watt four-bar linkage in this case, in some embodiments the first hinge of the first crank and the second hinge of the second crank can be located on a first side of a plane orthogonal to the rotation axis of the front steered wheel and passing through a constraint point of the shock absorber to the rotatable arm; and the second hinge of the first crank and the first hinge of the second crank can be on a second side of said plane.

In practice, the first hinge of the first crank and the second hinge of the second crank are closer to the front steered wheel, while the second hinge of the first crank and the first hinge of the second crank are at a greater distance with respect to the front steered wheel.

In some embodiments, the wheel support is hinged to the connecting rod about an axis substantially parallel to the axes of the first hinge and of the second hinge of the first crank and of the second crank. The arrangement of the hinges of the four-bar linkage, with respect to a plane parallel to the plane on which the wheel lies and passing through the hinge axis between the wheel support and the connecting rod, can be such that the first hinge of the first crank and the second hinge of the second crank are located on one side of this plane, for example in the half-space defined by this plane, in which the front steered wheel is located; vice versa, the second hinge of the first crank and the first hinge of the second crank are on the other side of this plane, i.e. in the half-space defined thereby which does not contain the front steered wheel.

In practical embodiments the wheel support supports the wheel in such a position that the rotation axis of the wheel is orthogonal to the axis about which the wheel support is hinged to the connecting rod.

The motor vehicle can comprise, for the front steered wheel, a disc brake, with a disc integral with the front steered wheel and a caliper, wherein said caliper is rigidly connected to the wheel support. In other embodiments, the caliper is rigidly connected to a support member mounted idle with respect to the connecting rod and to the wheel support.

According to another aspect, there is provided a saddle-riding motor vehicle with at least one rear driving wheel and at least one first front steered wheel, which is connected by means of a suspension to a rotatable arm provided with a rotary motion about a steering axis; wherein:

a wheel support, which supports the front steered wheel and defines the rotation axis of said wheel, is connected to the rotatable arm, with the interposition of a suspension;

the suspension comprises a four-bar linkage having a first crank with a first end hinged to the rotatable arm and a second end hinged to a connecting rod; a second crank with a first end hinged to the rotatable arm and a second end hinged to the connecting rod;

the wheel support is constrained in a constraint point of the connecting rod; and the four-bar linkage is configured so that during the deformation of the four-bar linkage as a result of the springing movement of the suspension, the constraint point travels along an approximately rectilinear trajectory.

BRIEF DESCRIPTION OF THE DRAWINGS

The invention will be better understood by following the description and the accompanying drawings, which illustrate non-limiting examples of embodiments of the invention. More in particular, in the drawing:

FIGS. 4A and 4B show an enlarged side view of the suspension of FIGS. 1 to 3 in an extended position and in a compressed position, respectively;

FIG. 4C shows an exploded view of the suspension of FIGS. 1, 2, 3, 4A, 4B;

DETAILED DESCRIPTION OF EMBODIMENTS

FIGS. 1, 2, 3, 4A, 4B, 4C, 4D, 5 and 6 illustrate a two-wheeled motor vehicle with a Watt four-bar linkage suspension, i.e., comprising a Watt mechanism, in a first embodiment.

Figure 1:
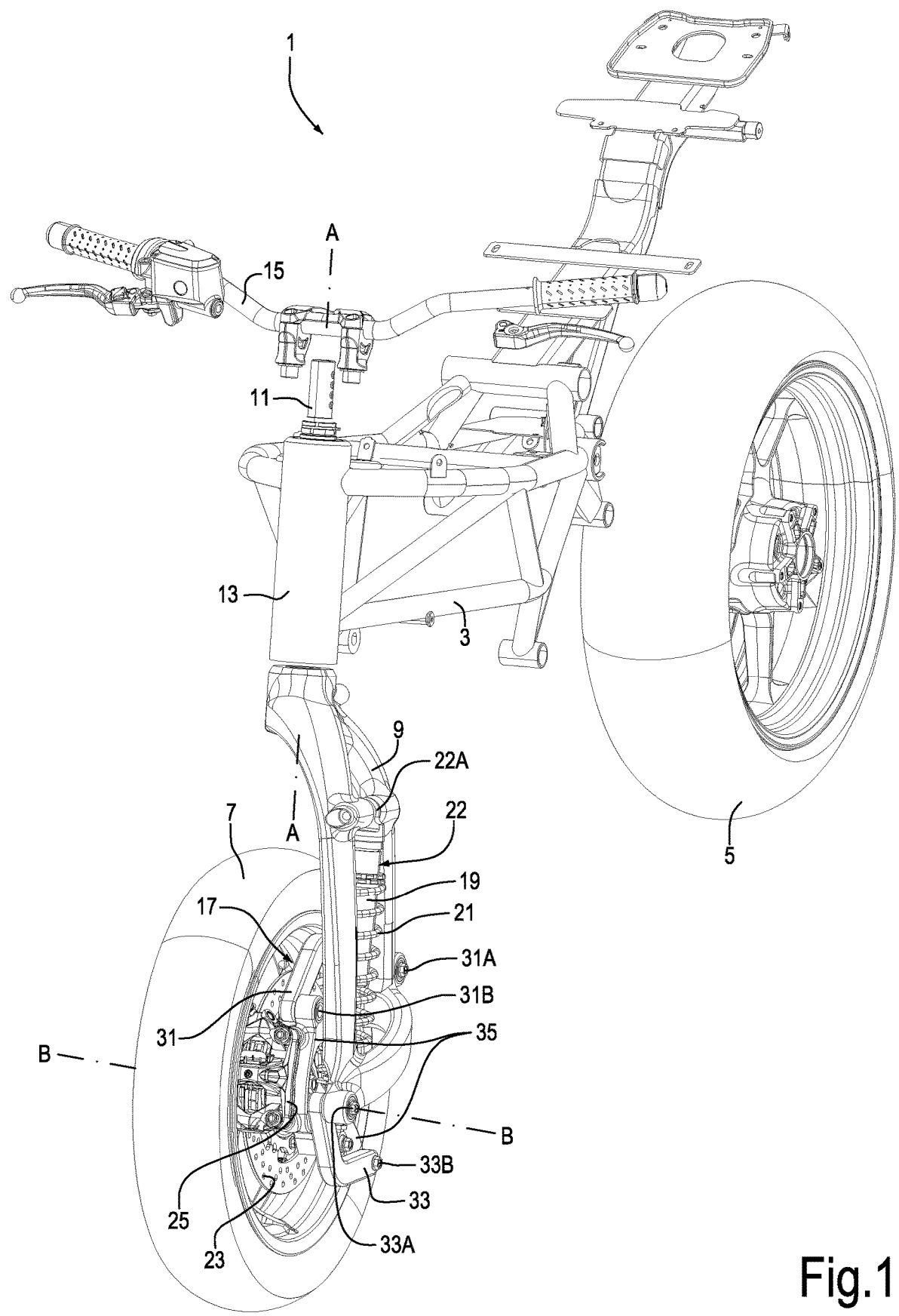
FIG. 1 shows an axonometric view with parts removed of a two-wheeled motor vehicle with a front suspension according to an embodiment.
Figure 2:
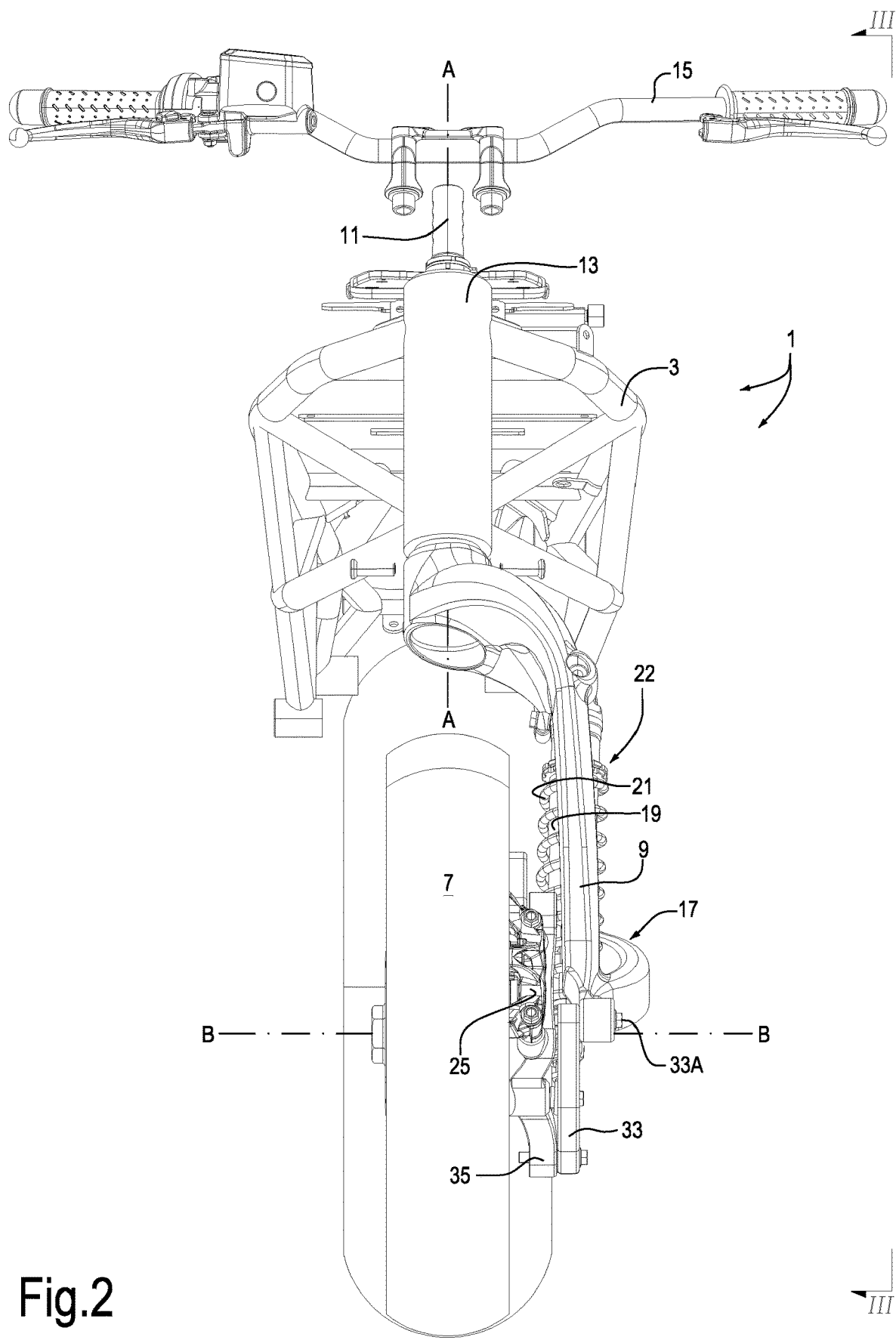
FIG. 2 shows a front view of the motor vehicle of FIG. 1.
Figure 3:
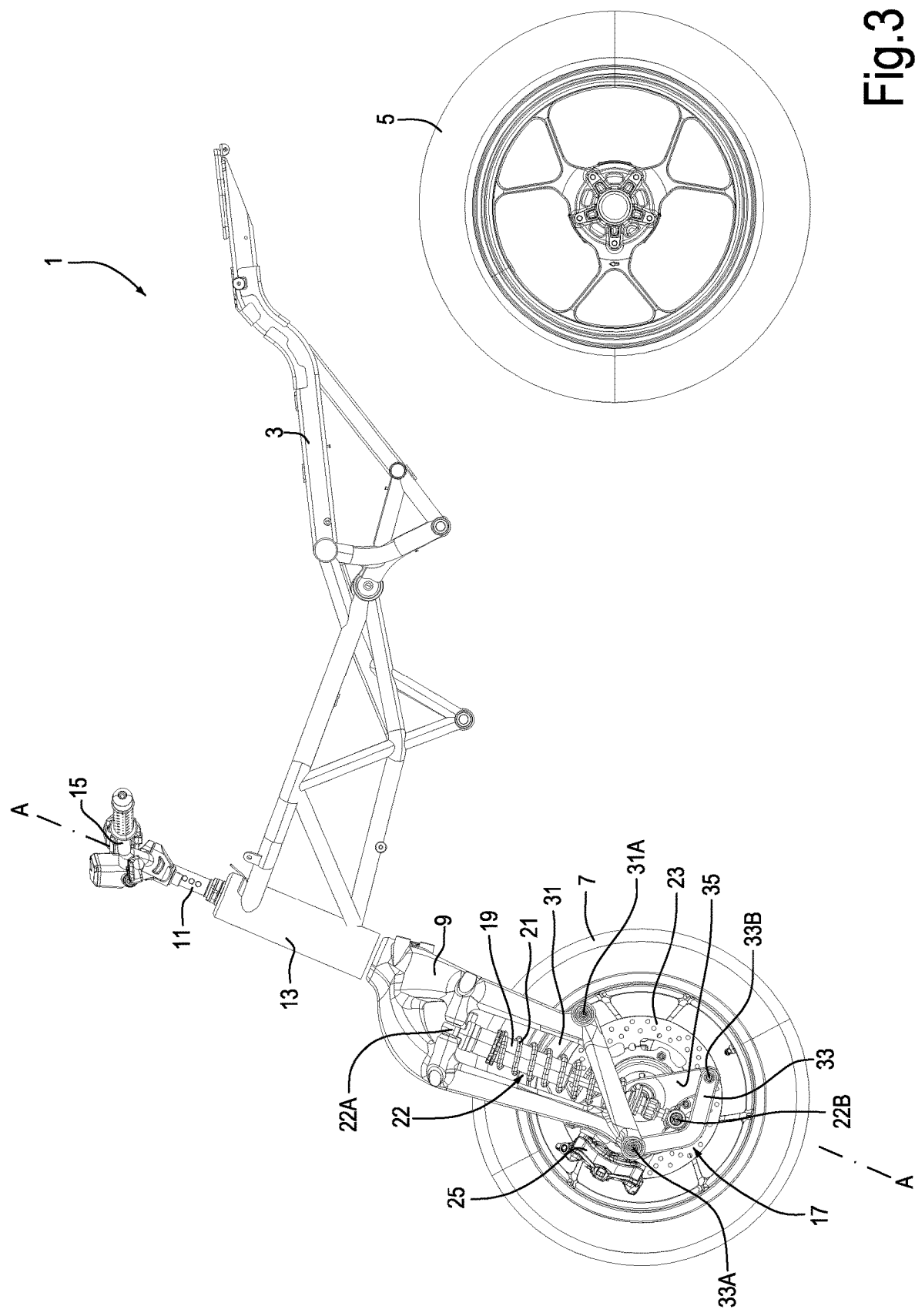
FIG. 3 shows a side view according to III-III of FIG. 2.

The motor vehicle 1 is illustrated briefly in FIGS. 1, 2 and 3. In these views, parts of the motor vehicle, not necessary to understand the structure and operation of the suspension, have been removed or omitted. The motor vehicle 1 comprises a frame 3, a rear driving wheel 5 and a front steered wheel 7. The wheels 5 and 7 are connected to the frame 3 by means of suspensions. The rear suspension, which connects the driving wheel 5 to the frame, is not illustrated and can be configured in any known manner. The front suspension, which connects the front steered wheel 7 to the frame 3, will be described in detail below.

The front steered wheel 7 is connected to a rotatable arm 9. This latter is rigidly connected to a steering column 11 rotatably housed in a steering tube 13 and maneuvered by means of a handlebar 15 to rotate about a steering axis A-A. Rotation of the rotatable arm 9 about the axis A-A allows steering of the vehicle 1.

The front steered wheel 7 is connected to the rotatable arm 9 by means of a suspension indicated globally with 17, which allows the springing movement of the frame 3, inclusive of steering tube 13, and of the steering column 11, of the handlebar 15 and of the rotatable arm 9 with respect to the front steered wheel 7. The suspension 17 is a shock absorbing suspension, comprising: a kinematic mechanism for connection between front steered wheel 7 and rotatable arm 9; and a shock absorber. This latter in turn comprises an elastic element and a brake or damper. In the embodiment illustrated the shock absorber is indicated with 22, the elastic element with 21 and the brake or damper with 19. This latter is housed coaxially inside the elastic element 21, in the form of coil spring.

The front steered wheel 7 is supported by means of the suspension 17 so as to rotate about the rotation axis B-B thereof.

The reference number 23 indicates a disc of a front brake of the motor vehicle 1. The brake further comprises a caliper 25 which can be supported by the suspension 17 in the manner described below.

The suspension 17 comprises components connected to one another by means of revolute pairs, i.e., components that move with respect to one another according to one degree of freedom, represented by a rotation movement about a respective hinge axis. Therefore, the suspension has no elements provided with a mutual translation movement.

Advantageously, the kinematic mechanism with revolute pairs that connects the front steered wheel 7 to the rotatable arm 9 comprises a Watt four-bar linkage, or Watt mechanism. This latter comprises, in addition to the rotatable arm 9, a first crank 31 and a second crank 33. The two cranks 31 and 33 are hinged to the rotatable arm 9 and to a connecting rod 35, also part of the Watt four-bar linkage.

More in particular, the first crank 31 is hinged by means of a first hinge 31A to the rotatable arm 9 and by means of a second hinge 31B to the connecting rod 35. In turn, the second crank 33 is hinged by means of a first hinge 33A to the rotatable arm 9 and by means of a second hinge 33B to the connecting rod 35. The hinges 31A, 31B, 33A, 33B form the revolute pairs of the Watt four-bar linkage.

The cranks 31 and 33 are of approximately the same length and shorter than the connecting rod 35. The length of the components 31, 33, 35 is meant as distance between the axes of the respective hinges. Therefore, for example, the length of the first crank 31 is given by the distance between the axes of the hinges 31A and 31B, the length of the second crank 33 is given by the distance between the axes of the hinges 33A and 33B, and the length of the connecting rod 35 is given by the distance between the axes of the hinges 31B and 33B.

A wheel support, indicated with 37, is constrained in a constraining point of the connecting rod 35, which is substantially equidistant between the axes of the hinges 31B and 33B. In practice, the wheel support 37 defines the rotation axis B-B of the wheel and holds said axis in an intermediate position between the axes of the hinges 31B and 33B and orthogonal to the connecting rod 35. In the embodiment of FIGS. 1 to 6 the caliper 25 of the disc brake 23, 25 is rigidly fixed to the wheel support 37, as visible in particular in the exploded view of FIG. 4C.

In the embodiment of FIGS. 1 to 6, the shock absorber 22 is also hinged to the connecting rod 35. More in particular, the shock absorber 22 is hinged at one end 22A to the rotatable arm 9 and at one end 22B to the connecting rod 35. The constraints between the shock absorber 22 and the rotatable arm 9 on one side and the connecting rod 35 on the other can be formed by ball hinges.

As can be easily understood from FIGS. 4A, 4B, which show an extended position and a compressed position of the suspension 17 and of the shock absorber 22, the springing movement of the front steered wheel 7 is permitted by a deformation movement of the Watt four-bar linkage and more in particular by a pivoting movement of the cranks 31, 33 about the axes 31A, 33A, by means of which the cranks are hinged to the rotatable arm 9, a roto-translation movement of the connecting rod 35 and a compression/extension of the shock absorber 22 corresponding to this pivoting movement.

As a result of the properties of the Watt four-bar linkage, at least within a certain angle of pivoting motion of the cranks 31, 33 the center of the connecting rod 35, which lies on the rotation axis B-B of the front steered wheel 7, moves along a substantially rectilinear trajectory. The elements forming the Watt four-bar linkage are mounted so that the trajectory of the rotation axis B-B of the front steered wheel 7 is approximately rectilinear for the entire travel from the position of maximum extension to the position of maximum compression of the suspension 17.

Figure 4D:
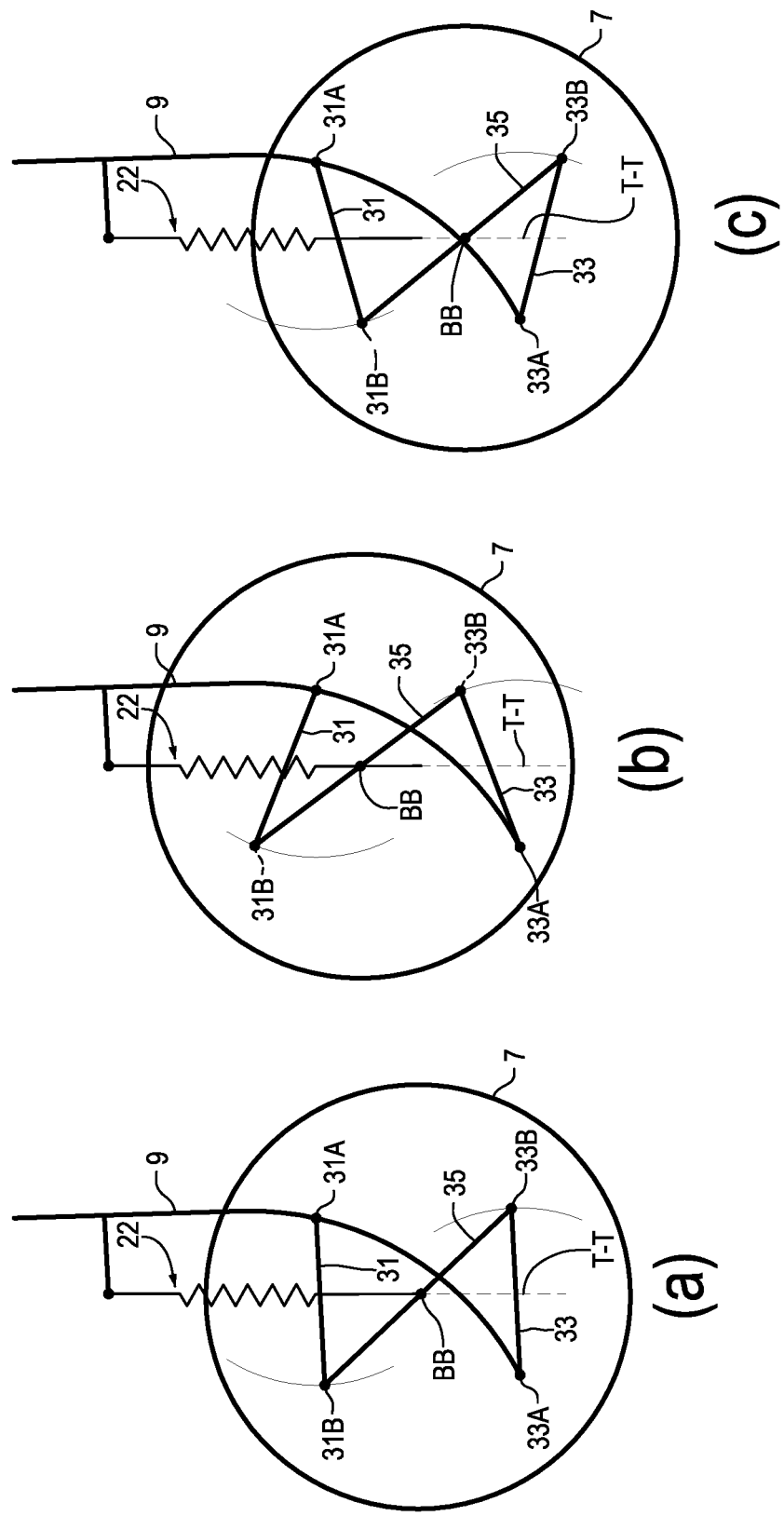
FIG. 4D shows a schematic representation of the suspension in three different positions.
Figure 6:
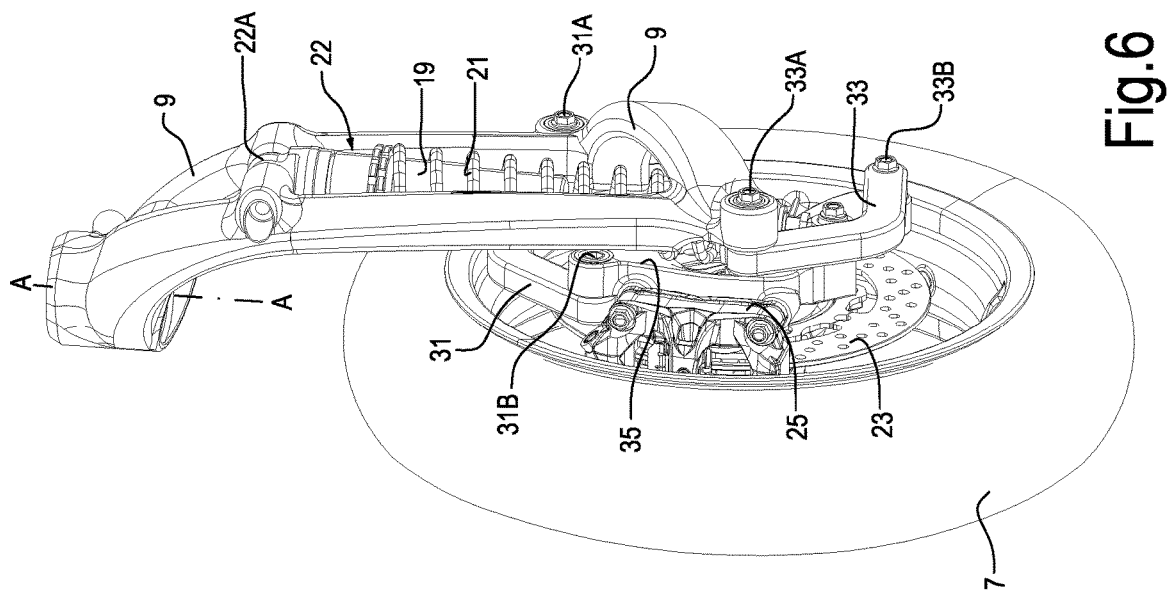
FIG. 6 shows an axonometric view of the suspension of FIGS. 4A, 4B and 5.
Figure 5:
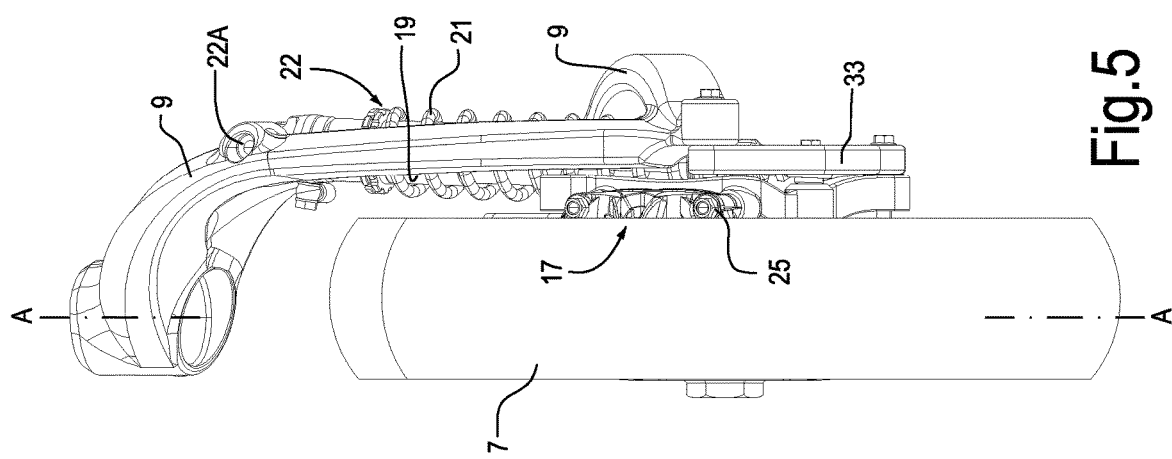
FIG. 5 shows a front view according to the line V-V of FIG. 4A.

This feature of the suspension thus configured can be easily understood by observing the schematic representation of FIG. 4D. Here the suspension, the rotatable arm 9 and the front steered wheel 7 are represented schematically. FIG. 4D shows three distinct positions of the suspension: an intermediate position (a), a fully compressed position (b) and a fully extended position (c). It can be observed that, as a result of the properties of the Watt four-bar linkage 9, 31, 33, 35, the center of the front steered wheel 7, coinciding with the line of the rotation axis B-B of said front steered wheel, moves on a substantially rectilinear trajectory T-T.

In the present context, "approximately rectilinear", "substantially rectilinear" or "about rectilinear" means a trajectory that differs from a perfectly rectilinear trajectory by less than 2 mm and preferably less than 1 mm, in the range of use of the suspension, i.e., in any position taken by the Watt four-bar linkage during normal use of the motor vehicle.

Returning now to the construction features of the first exemplary embodiment, as can be seen in particular in FIGS. 4A, 4B, the first hinge 31A for connecting the first crank 31 to the rotatable arm 9 and the second hinge 33B for connecting the second crank 33 to the connecting rod 35 are positioned on a first side of a plane P-P that contains the rotation axis B-B of the front steered wheel 7 and that is approximately parallel to the trajectory of said rotation axis B-B in the springing movement. The second hinge 31B for connecting the first crank 31 to the connecting rod 35 and the first hinge 33A for connecting the second crank 33 to the rotatable arm 9 are positioned on the other side of said plane P-P. In practice, the hinges 31A and 33B are in a backward position (with respect to the normal advancement direction of the motor vehicle 1 in forward travel) with respect to the hinges 31B and 33A. According to yet another definition criterion, the hinges 31A and 33B are on one side of (and more precisely behind) a plane containing the rotation axis B-B of the front steered wheel 7 and passing through the upper connection point 22A of the shock absorber 22 to the rotatable arm 9, i.e., a plane containing the rotation axis B-B of the front steered wheel 7 and along which this axis translates during the springing movement.

This particular arrangement of the components forming the Watt four-bar linkage makes it possible to produce a compact arrangement, suitable to form the kinematic mechanism for connecting sprung masses and unsprung masses in a suspension of a front steered wheel of a saddle-riding motor vehicle 1, such as a motorcycle or a scooter.

The embodiment described with reference to FIGS. 1 to 6 is susceptible to many modifications, some of which are described below with reference to FIGS. 7 to 20.

Figure 8:
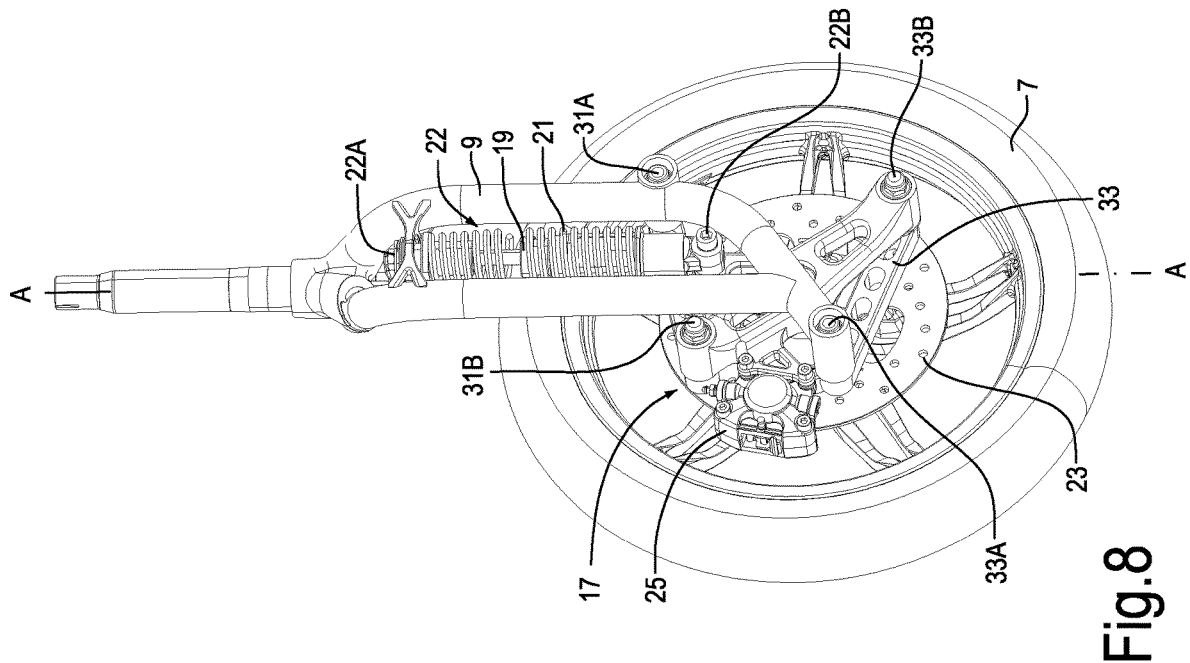
FIG. 8 shows an axonometric view of the suspension of FIG. 7.
Figure 7:
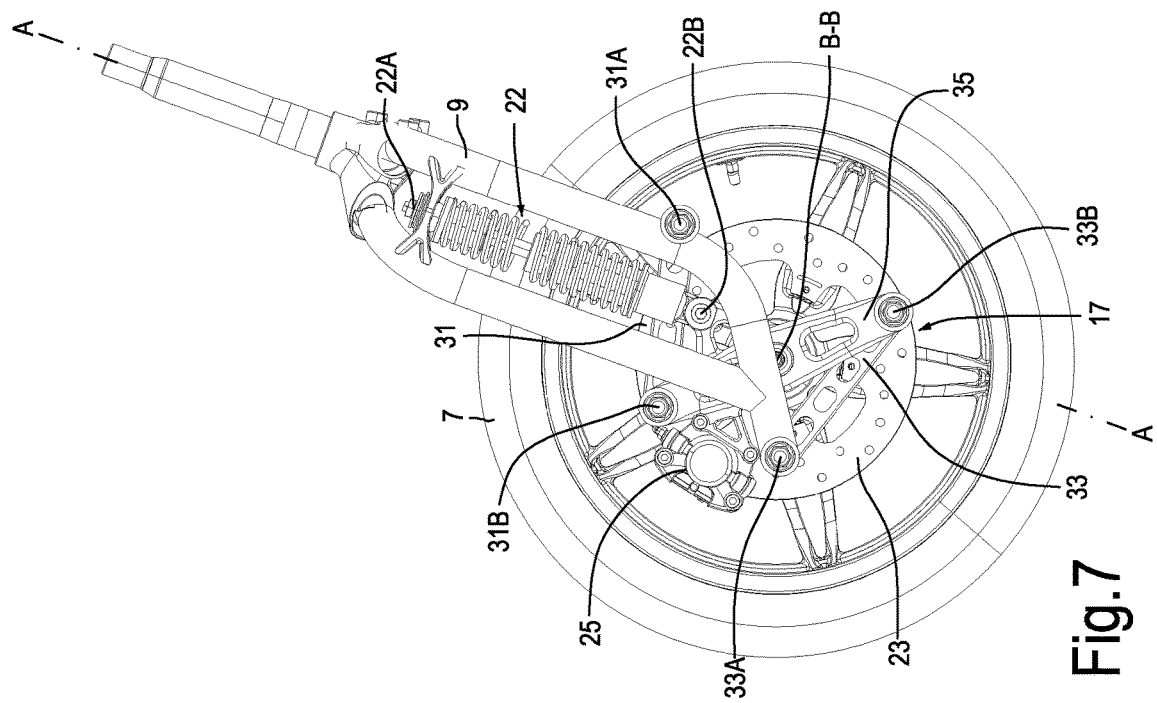
FIG. 7 shows a side view, similar to FIG. 4A, of a further embodiment of a front suspension.

FIGS. 7 and 8 illustrate a side view and an axonometric view of the front steered wheel 7 with related suspension 17 and rotatable arm 9 in an embodiment that differs from the one described previously in particular for the constraint point of the shock absorber 22 to the kinematic mechanism of the suspension 17. More in particular, the shock absorber 22, comprising the brake or damper 19 and the spring 21, is still constrained to the connecting rod 35, but in an area thereof facing upward, instead of downward, i.e., positioned on the connecting rod 35 on the side facing the first crank 31, while in FIGS. 1 to 6 the constraint 22B is positioned on the side of the connecting rod 35 facing the second crank 33. The remaining parts, indicated with the same reference numbers used in FIGS. 1 to 6, are substantially equivalent to those described above.

Figure 10:
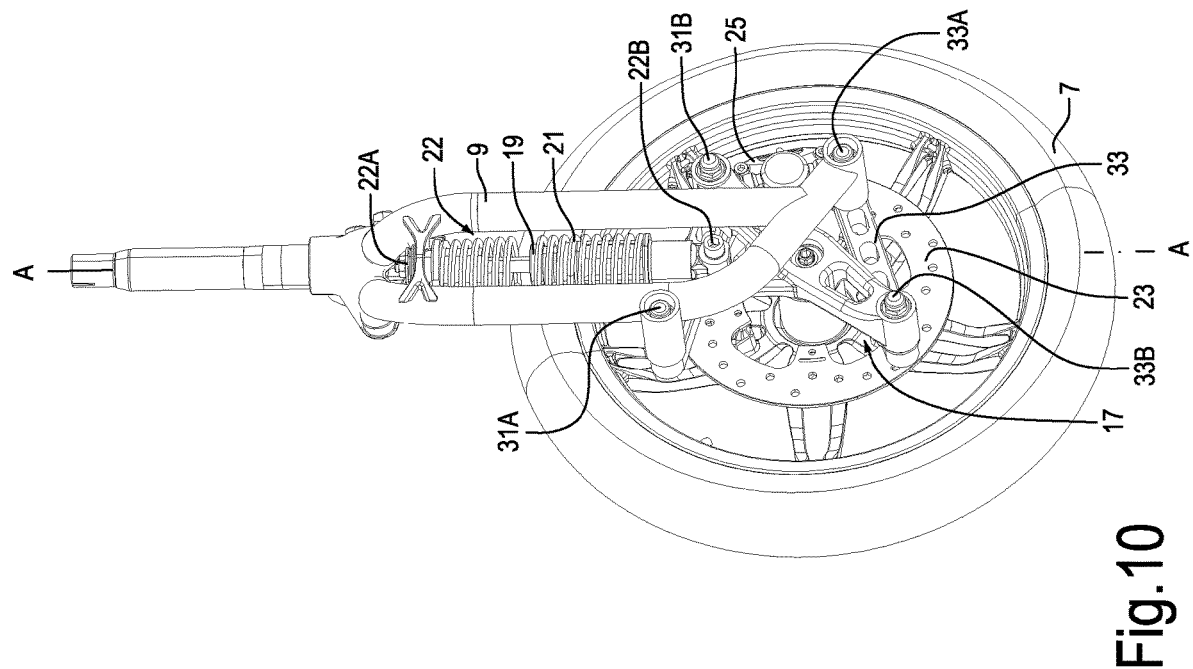
FIG. 10 shows an axonometric view of the suspension of FIG. 9.
Figure 9:
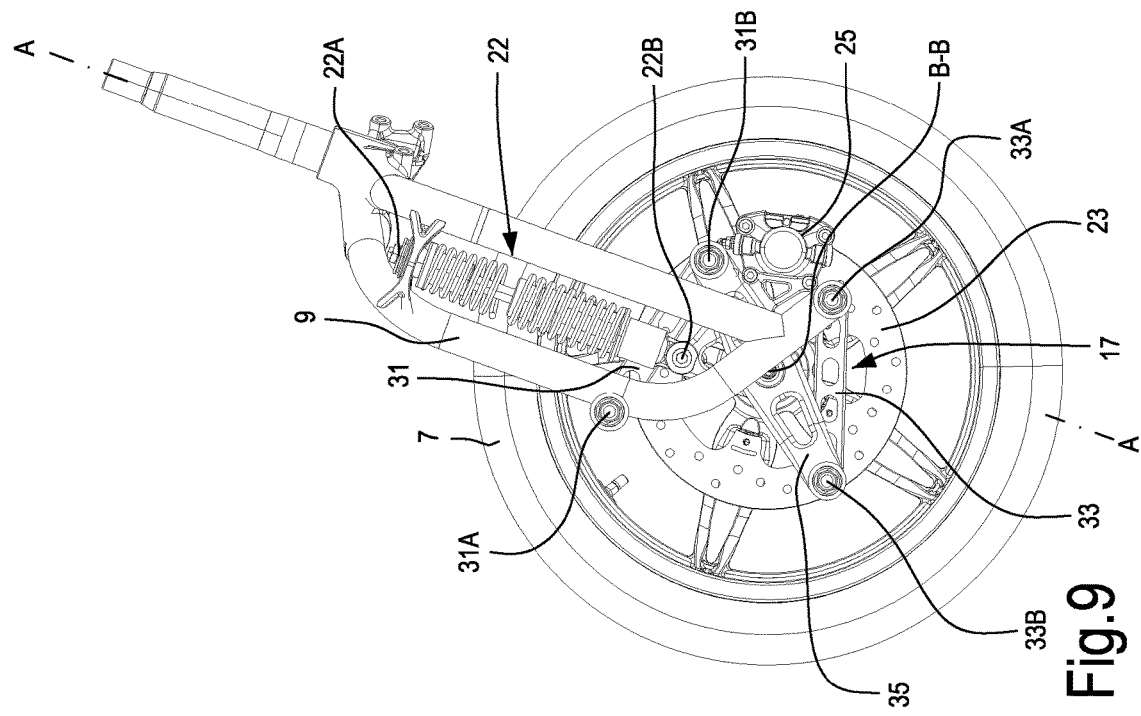
FIG. 9 shows a side view, similar to FIG. 7, of a further embodiment of a front suspension.

FIGS. 9 and 10 show a further embodiment, similar to that of FIGS. 7 and 8, wherein the same or equivalent parts are indicated with the same reference numbers used in FIGS. 1 to 8. The configuration of FIGS. 9, 10 is substantially symmetrical to the configuration of FIGS. 7, 8. In FIGS. 7, 8 (just as in FIGS. 1 to 6) the upper crank 31 is oriented so that the hinge 31A for connection to the rotatable arm 9 is at the end of the crank 31 facing backward and the hinge 31B for connection to the connecting rod 35 is at the end of the crank 31 facing forward; the lower crank 33 is oriented in the opposite direction, i.e., with the hinge 33A for connection to the rotatable arm 9 at the end facing forward and the hinge 33B for connection to the connecting rod 35 facing backward. In the configuration of FIGS. 9 and 10 the arrangement is reversed: the upper crank 31 has the first hinge 31A at the end facing forward and the second hinge 31B at the end facing backward. The lower crank 33 has the end of the hinge 33B facing forward and the end of the hinge 33A facing backward.

Figure 12:
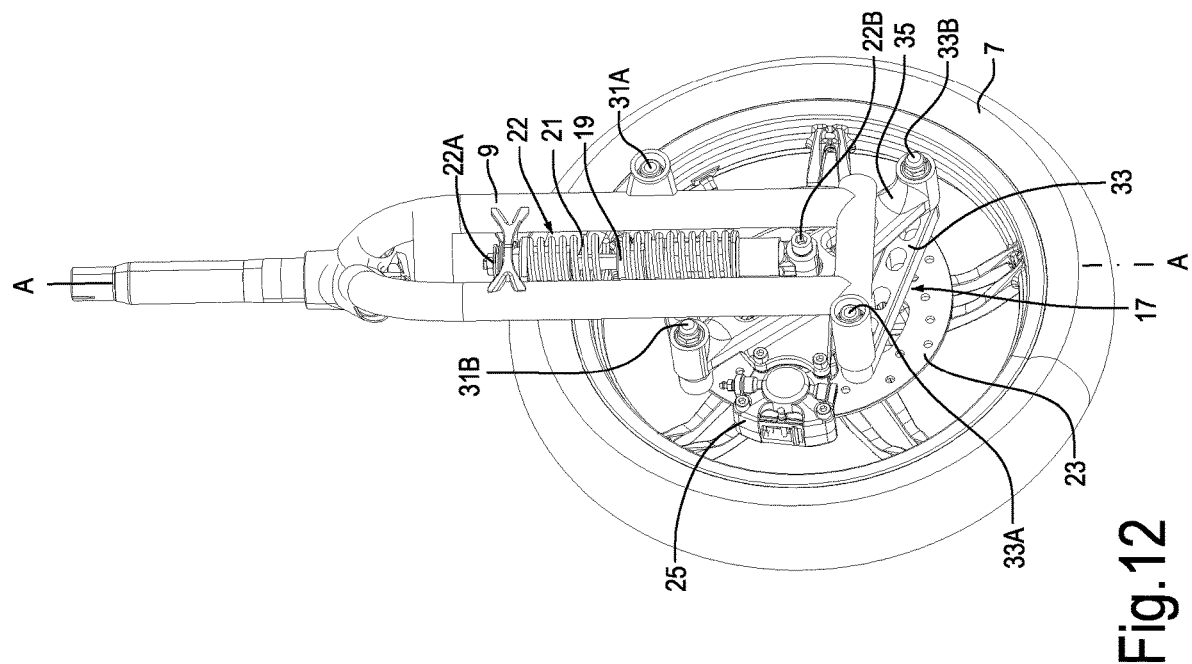
FIG. 12 shows an axonometric view of the suspension of FIG. 11.
Figure 11:
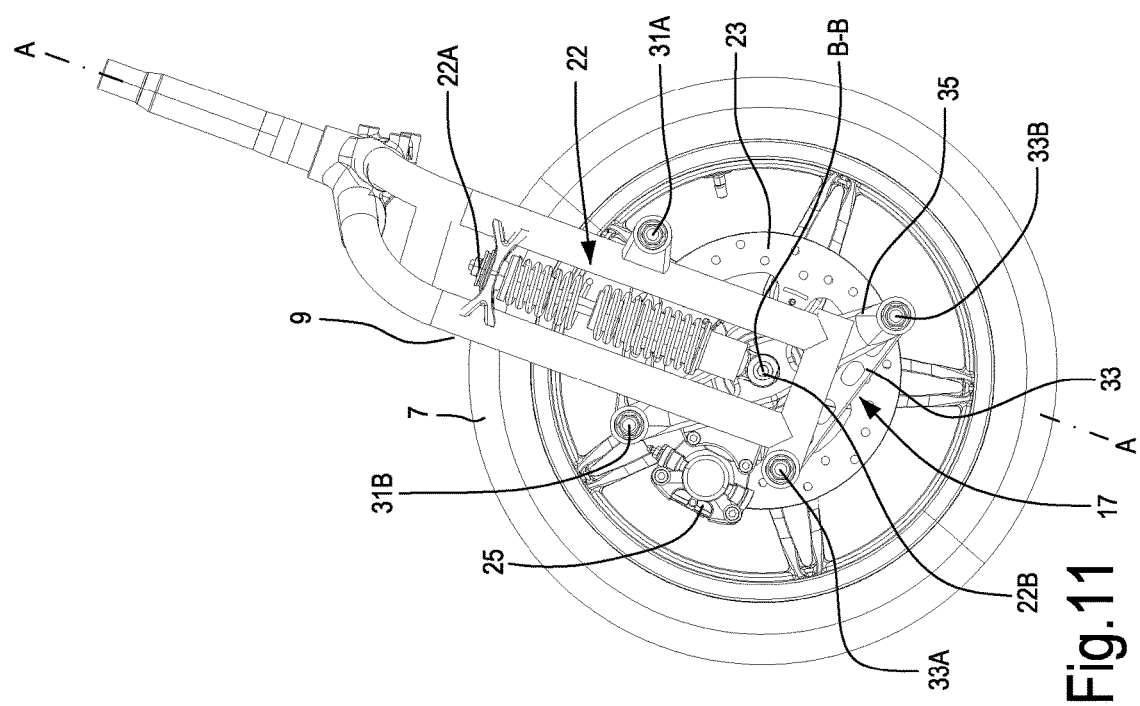
FIG. 11 shows a side view, similar to FIG. 9, of a further embodiment of a front suspension.
Figure 14:
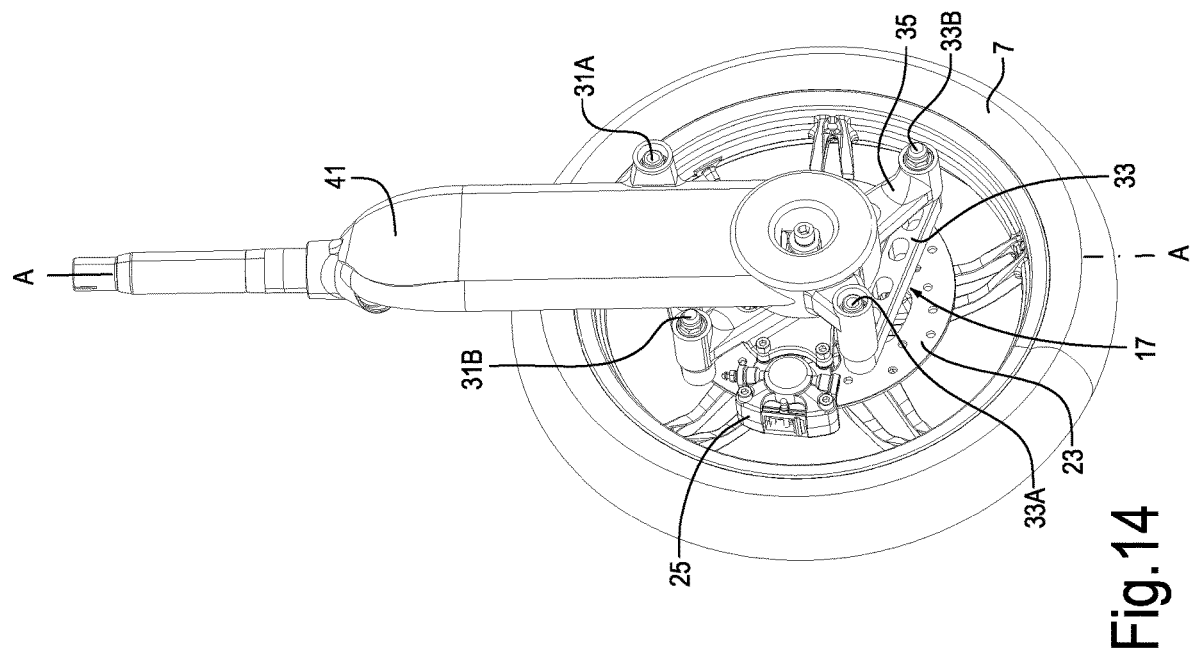
FIG. 14 shows an axonometric view of the suspension of FIG. 13.
Figure 13:
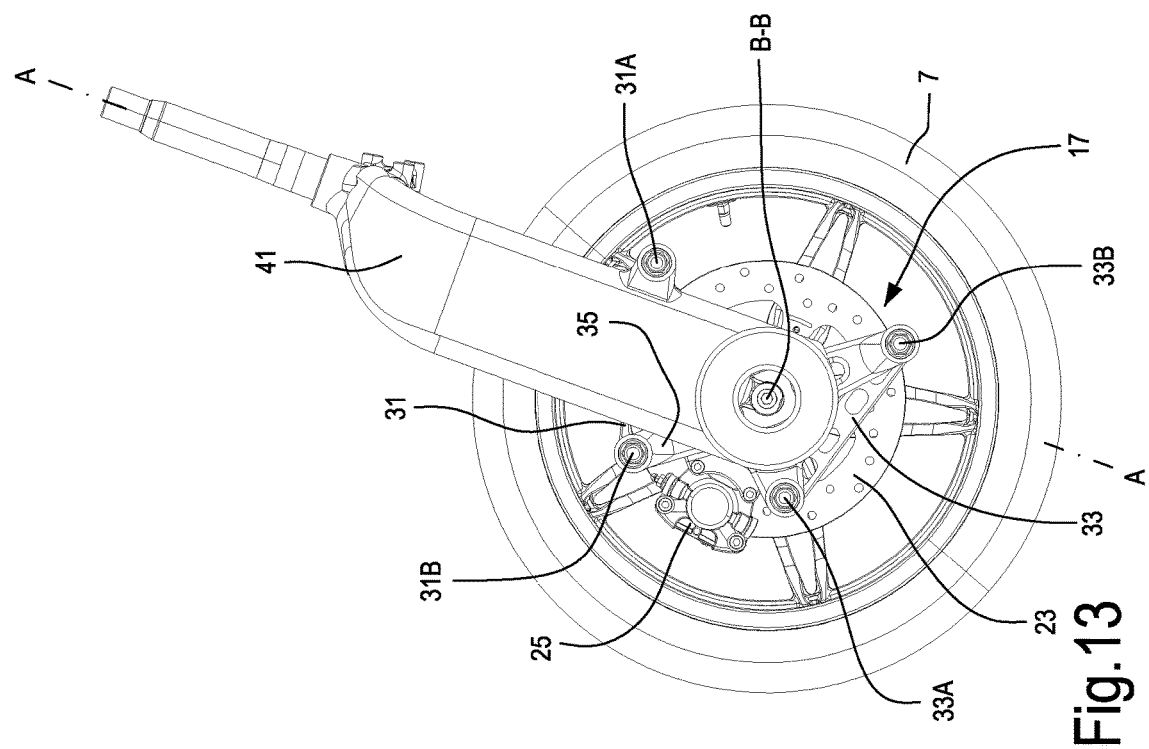
FIG. 13 shows a side view, similar to FIG. 11, of a further embodiment of a front suspension.

FIGS. 11 and 12 show a side view and an axonometric view of a further embodiment similar to the embodiment of FIGS. 7 and 8. The same numbers indicated the same or equivalent parts to those described above. The main difference between FIGS. 1 to 10 and FIGS. 11, 12 consists in the fact that the lower end of the shock absorber 19 in this case is constrained at the bottom, in the point 22B on the rotation axis B-B of the front steered wheel 7. The configuration that is obtained is particularly compact. The suspension 17, with the shock absorber 22 and the rotatable arm 9 can be closed in a casing 41.

Figure 15:
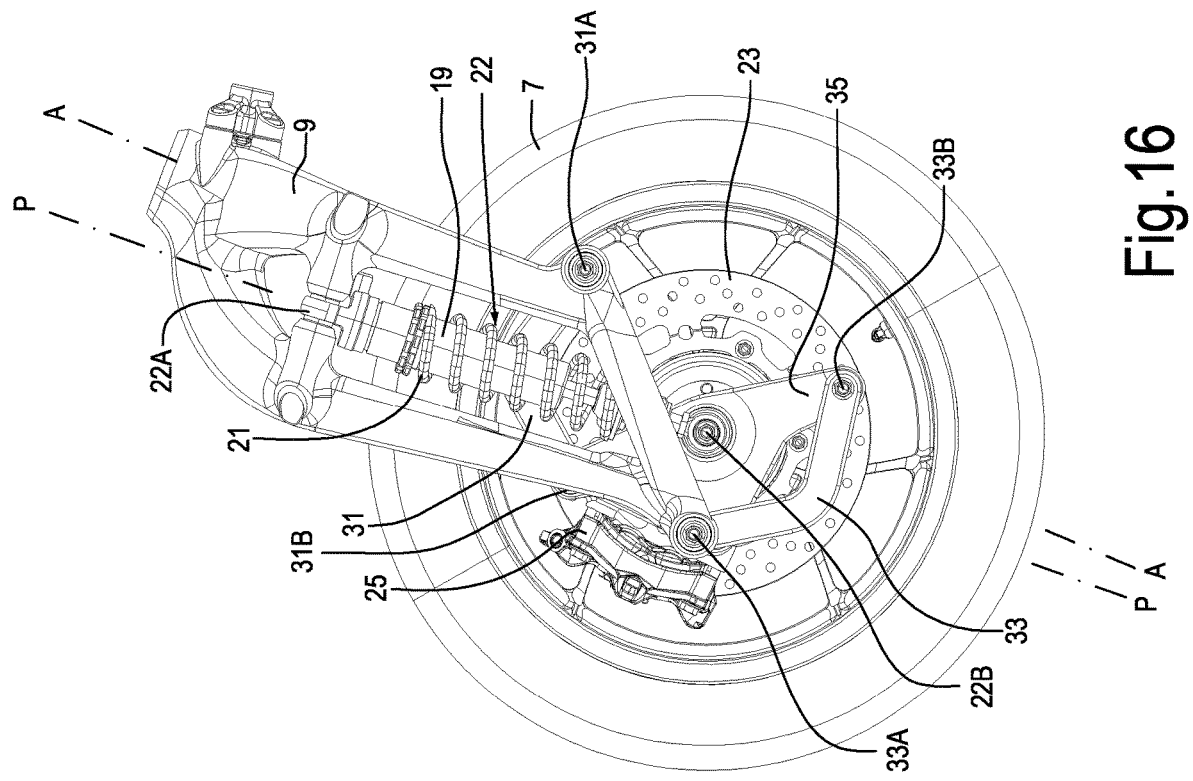
FIG. 15 shows a side view of a further embodiment of a front suspension.

FIG. 15 shows a side view of a further embodiment, in which the same numbers indicate the same or equivalent parts to those already described previously. The embodiment of FIG. 15 is substantially the same as the embodiment of FIGS. 1 to 6, with the main difference that the shock absorber 22 is connected at the bottom in 22B to the crank 33 rather than to the connecting rod 35.

Figure 16:
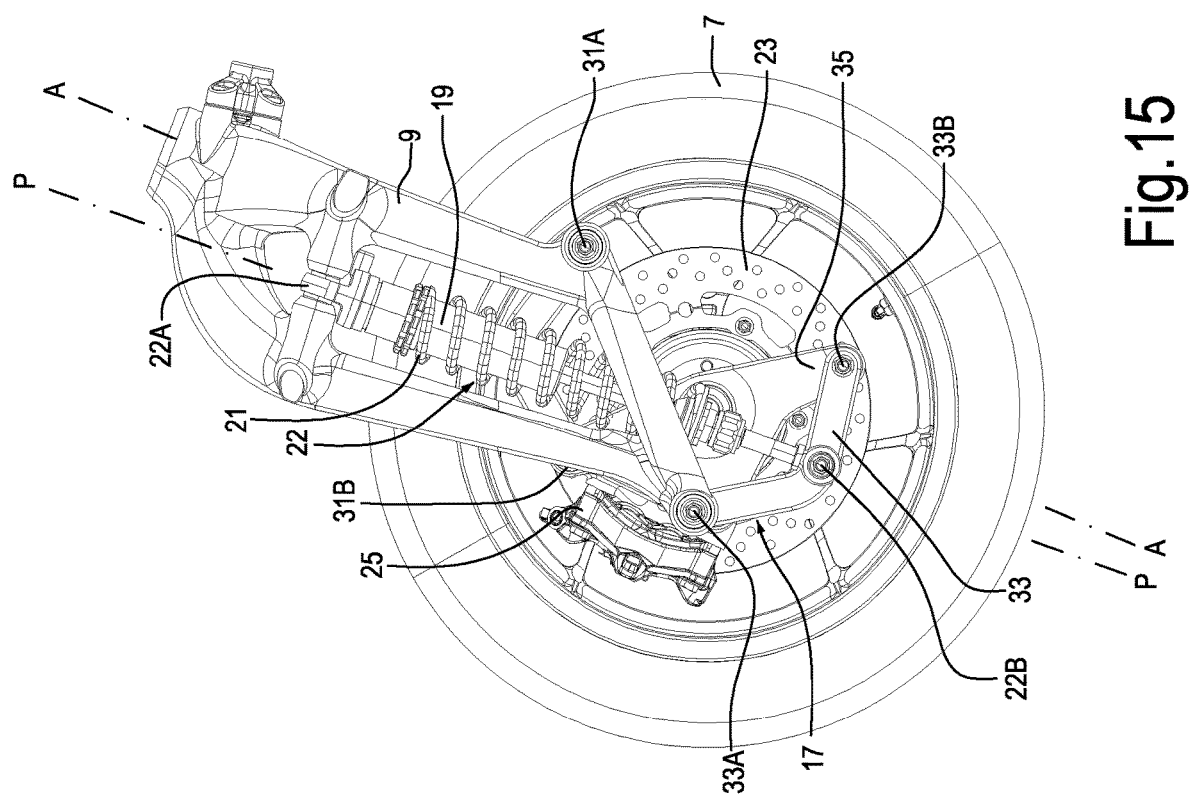
FIG. 16 shows a side view of yet another embodiment of a front suspension according to the present description.

FIG. 16 shows an embodiment substantially the same as the embodiment of FIGS. 1 to 6, with the difference that the shock absorber 22 is connected at the bottom by means of a hinge 22B at the rotation axis B-B of the front steered wheel 7.

As described previously, and as can be seen in particular in FIG. 4C, the caliper 25 of the disc brake 23, 25 can be rigidly constrained to the connecting rod 35. In this case, the caliper 25 rotates, integral with the connecting rod 35. This takes place, in particular, during braking. Depending upon the position of the caliper 25 with respect to the rotation axis B-B of the front steered wheel 7 this movement can have a non-negligible pro-dive or anti-dive effect, due to the fact that the instant rotation center of the connecting rod is close to the contact point of the front steered wheel 7 with the ground. This instant rotation center is defined by the intersection of the extension of the two straight line segments that connect the hinges 31A, 31B and 33A, 33B, respectively, to one another. This pro-dive or anti-dive effect could be undesirable.

In order to prevent or reduce the pro-dive or anti-dive effect of the suspension during braking, in some embodiments the caliper 25 can be rigidly connected to a member that is mounted coaxial to the front steered wheel 7, and hence to the connecting rod 35, but not integral therewith and the instant rotation center of which is at a greater distance.

Figure 18:
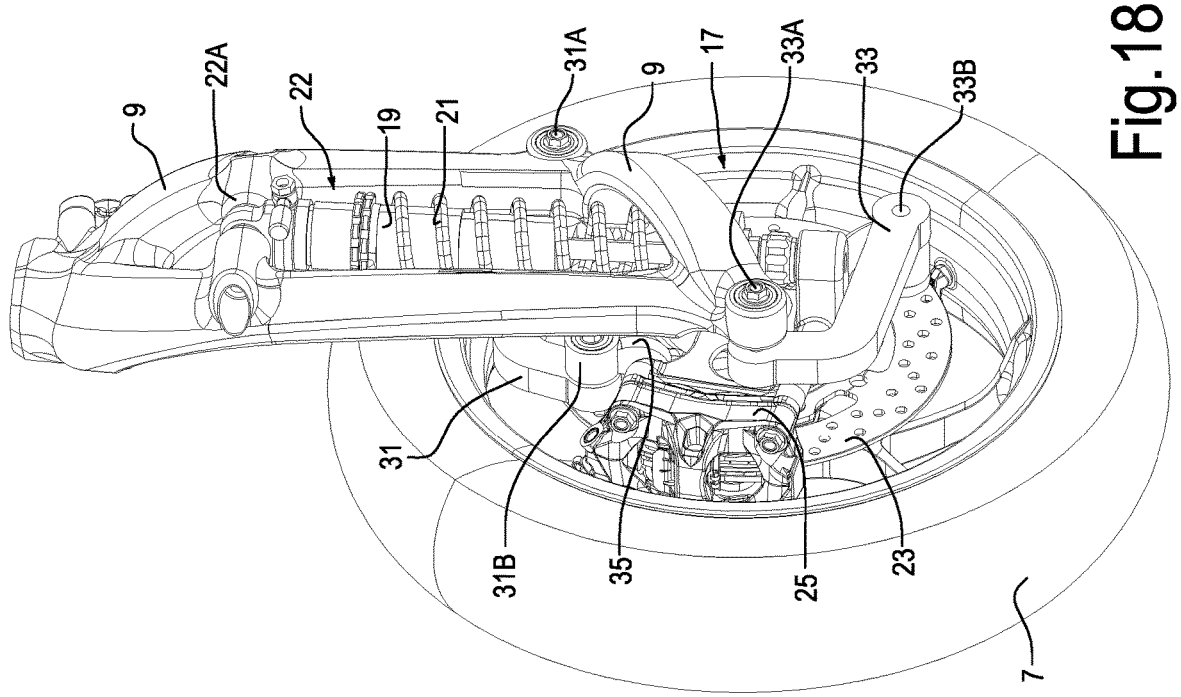
FIG. 18 shows an axonometric view of the suspension of FIG. 17.
Figure 17:
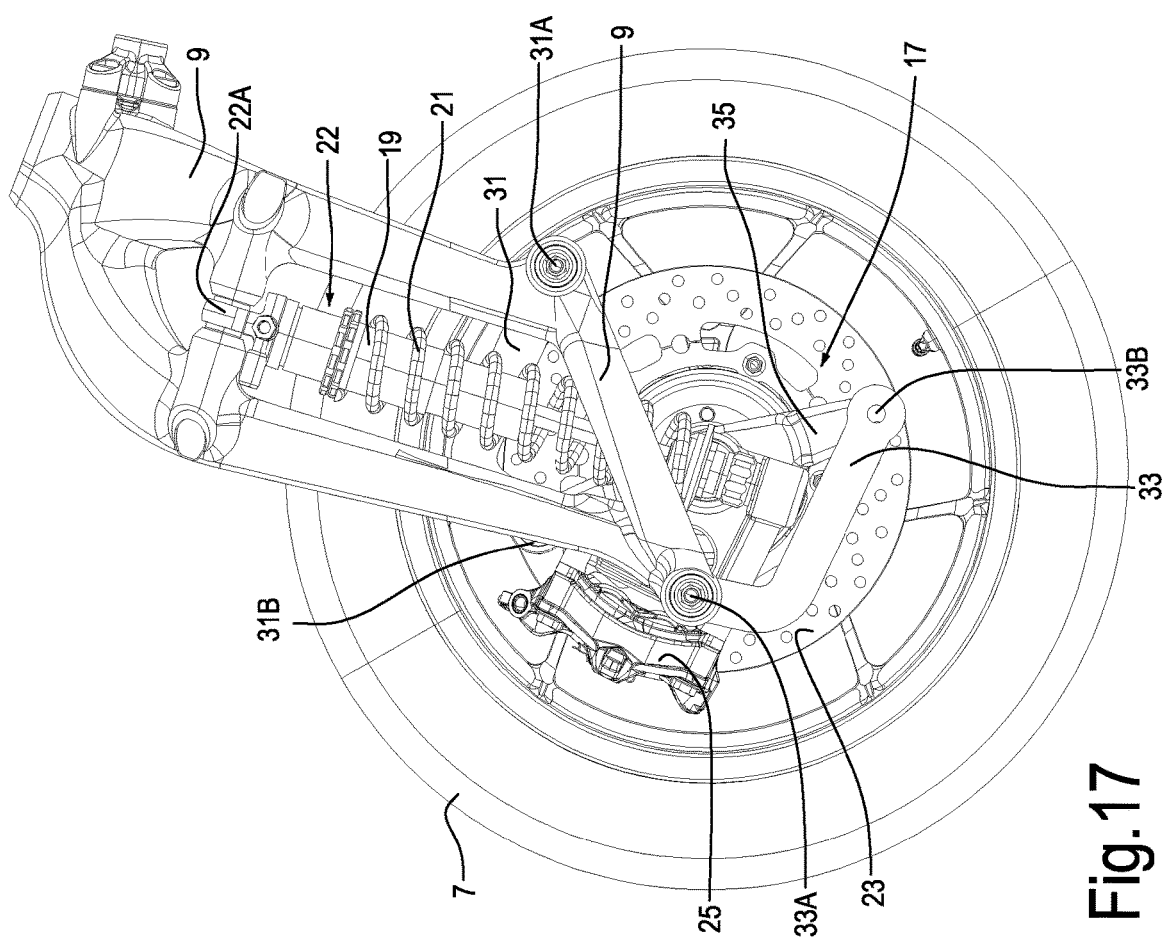
FIG. 17 shows a side view of an embodiment of a front suspension, with a brake caliper mounted idle with respect to the Watt four-bar linkage.
Figure 19:
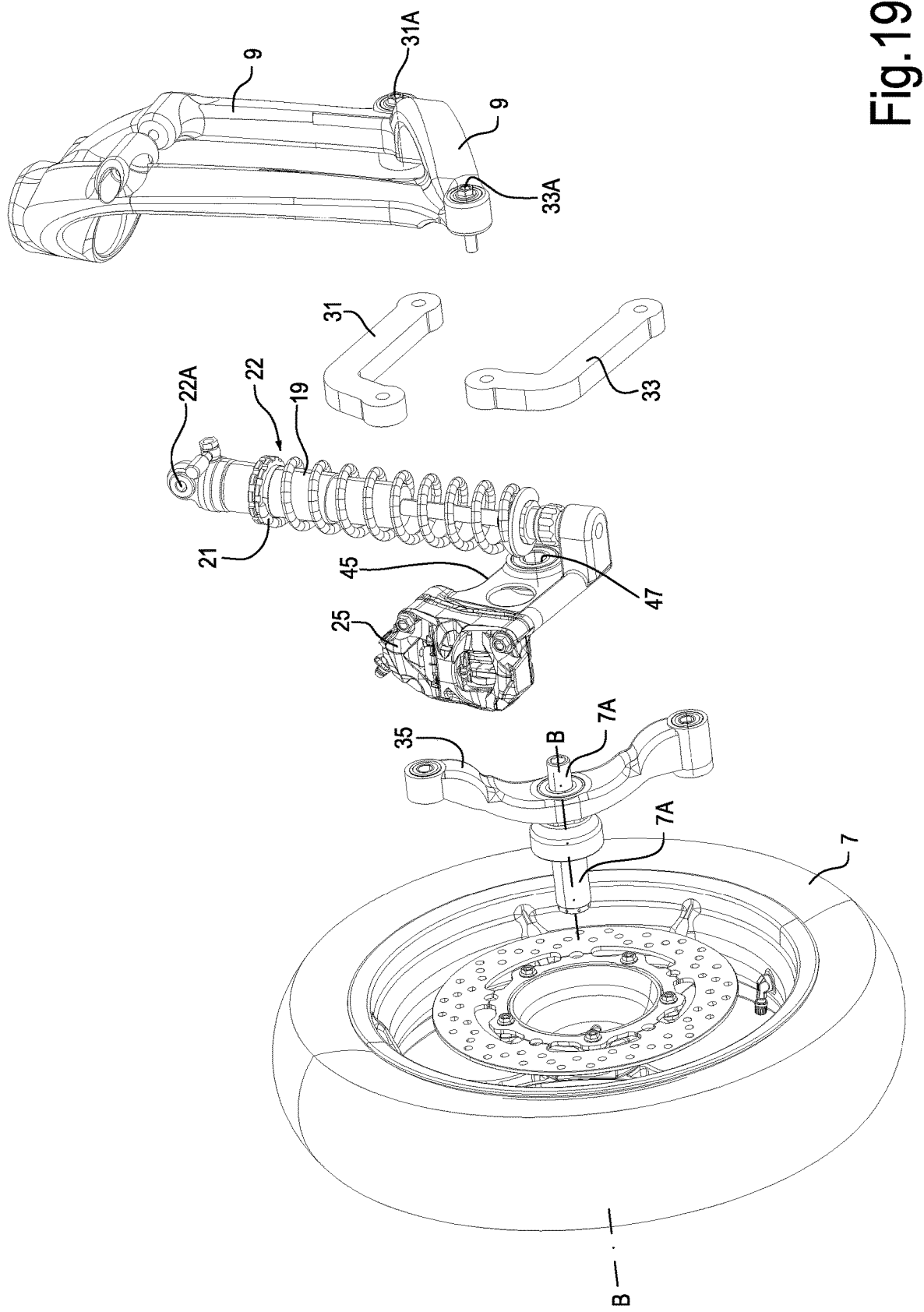
FIG. 19 shows an exploded view of the suspension of FIGS. 16 and 17.

An embodiment of this type is shown in FIGS. 17, 18, 19. In these figures, the same numbers indicate the same or equivalent parts to those already described with reference to FIGS. 1 to 6, which will not be described again. The support member of the caliper 25 of the disc brake is visible in particular in the exploded view of FIG. 19. The support member is indicated with 45. It can have a hole for housing a bearing 47 into which an axle 7A of the front steered wheel 7, or an extension of this axel, is inserted. The connecting rod 35 of the Watt four-bar linkage is also idly supported on the axle 7A. The member 45 can be rigidly connected to one end 22B of the shock absorber 22. The interlocking constraint between the shock absorber 22 and the member 45 retains the caliper 25 against the rotation about the axis B-B during braking. As the connecting rod 35 and the support member 45 of the caliper 25 are idle with respect to each other, the connecting rod 35 and the member 45 can rotate freely with respect to each other about the rotation axis B-B. The pro-dive or anti-dive effect is very limited or negligible, as the member to which the caliper is rigidly connected in this case consists of the shock absorber 22, whose instant rotation center is located at a great distance, almost infinity.

Figure 20:
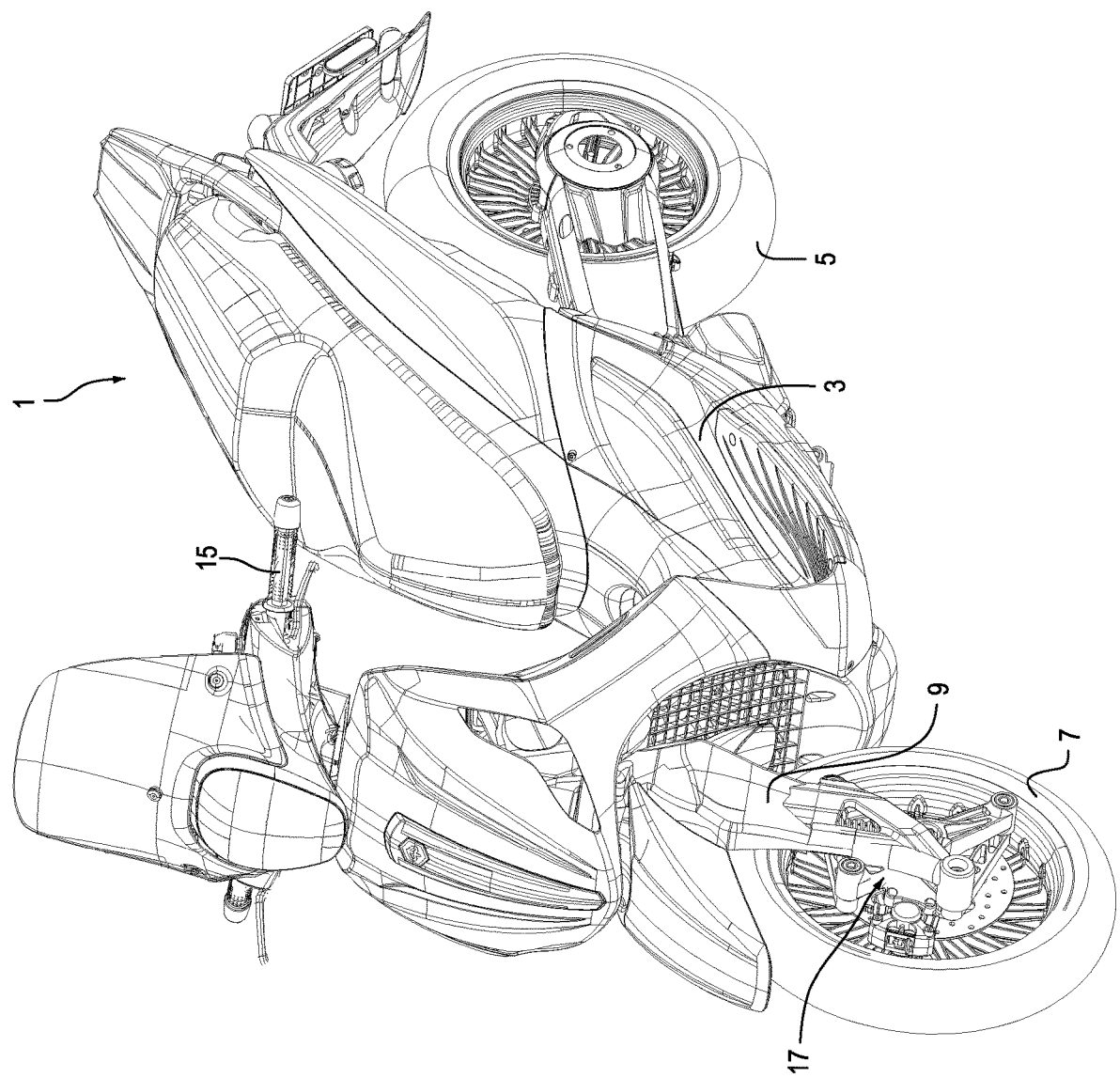
FIG. 20 shows an application of a suspension according to the invention to a motor vehicle in the form of scooter.

The suspensions described above can be used in saddle-riding motor vehicles in the form of motorcycles, as schematically illustrated in FIGS. 1, 2 and 3, but can also be adapted for use on other types of saddle-riding motor vehicles. FIG. 20 illustrates, purely by way of example, a scooter, once again indicated with 1, which has a Watt four-bar linkage suspension for the front steered wheel 7, configured as described above.

In all the embodiments illustrated in FIGS. 1 to 20, the hinges that connect the cranks 31, 33 to the connecting rod 35 and to the rotatable arm 9 are arranged with their hinge axes parallel to one another and parallel to the rotation axis B-B of the front steered wheel 7. In this way, in substance the Watt four-bar linkage formed by the components 9, 31, 33, 35 lies on a plane orthogonal to the rotation axis B-B of the front steered wheel 7. The rotation axes of the revolute pairs of the Watt four-bar linkage are therefore oriented in a right-left direction, i.e., transverse with respect to a median plane of the motor vehicle 1.

Although this gives rise to a particularly efficient suspension, it is not the only possible embodiment of a four-bar linkage suspension that enables a substantially rectilinear trajectory of the rotation axis of the front steered wheel 7 to be obtained during the springing movement of this wheel, using a kinematic mechanism that only has revolute pairs and no prismatic or cylindrical pair, i.e., is devoid of members having a relative translation motion.

In other embodiments, the hinges that connect the members forming the Watt four-bar linkage to one another can be arranged with their axes parallel to one another and oriented at 90° with respect to the rotation axis B-B of the front steered wheel 7, i.e., orthogonal to a plane containing this rotation axis B-B of the front steered wheel 7. In other words, the hinge axes of the revolute pairs that connect the components of the four-bar linkage to each other are oriented so as to lie on vertical planes parallel to the median plane of the motor vehicle, i.e., on vertical planes extending in the direction of travel of the motor vehicle.

An embodiment of this type is illustrated in FIGS. 21 to 25. Parts corresponding to parts already described with reference to the preceding figures are indicated with the same reference numbers increased by "100". FIGS. 21 to 25 show only the front steered wheel 107 with the respective suspension 117 and the rotatable arm 109, while the motor vehicle, which can be a motor vehicle similar to the one indicated with 1 in FIG. 1 or 20, is not shown.

Figure 21:
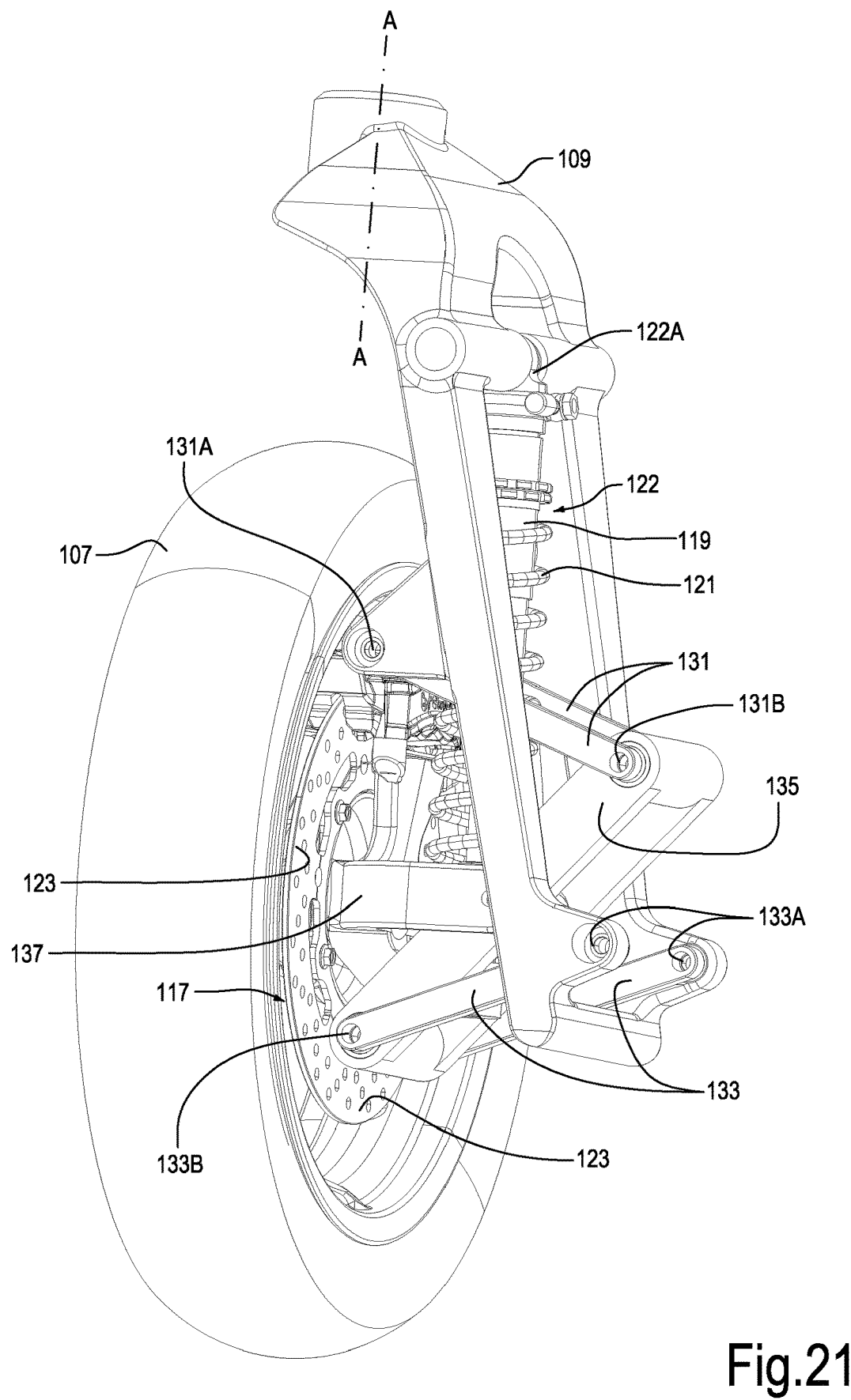
FIG. 21 shows an axonometric view of a suspension according to the invention, wherein the rotation axes of the components of the Watt four-bar linkage are orthogonal to the rotation axis of the front steered wheel.
Figure 22:
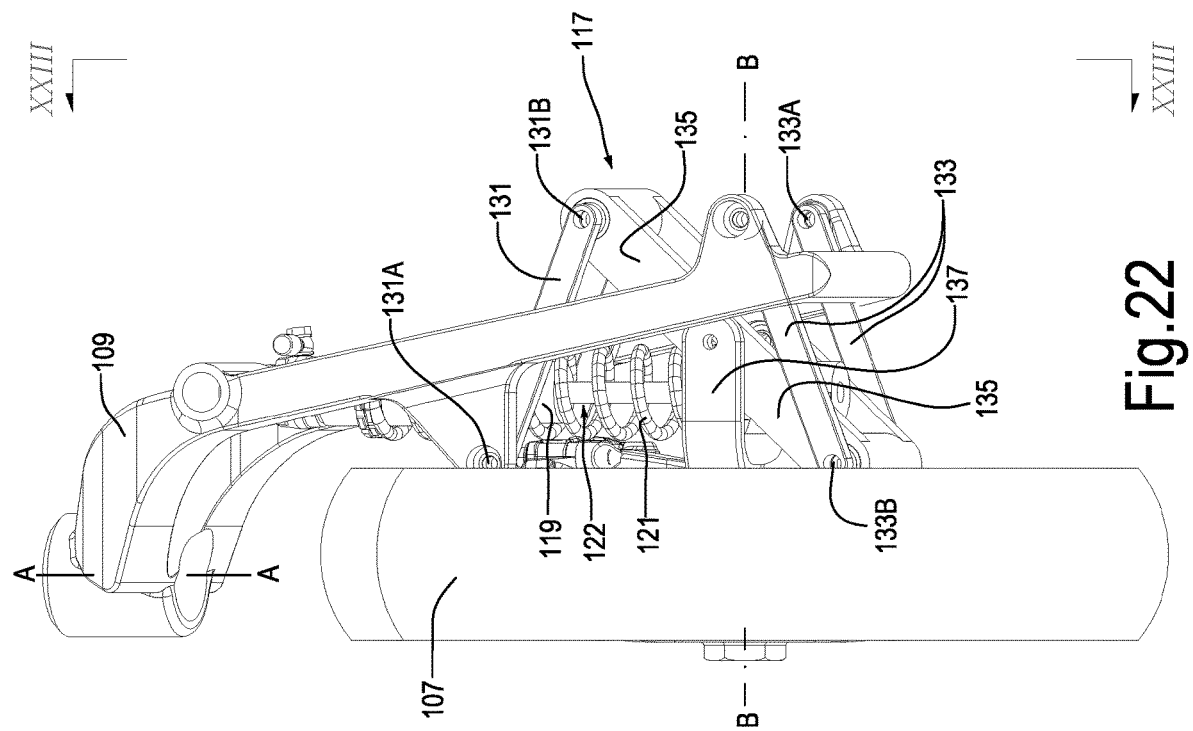
FIG. 22 shows an axonometric view of the suspension of FIG. 21.
Figure 23:
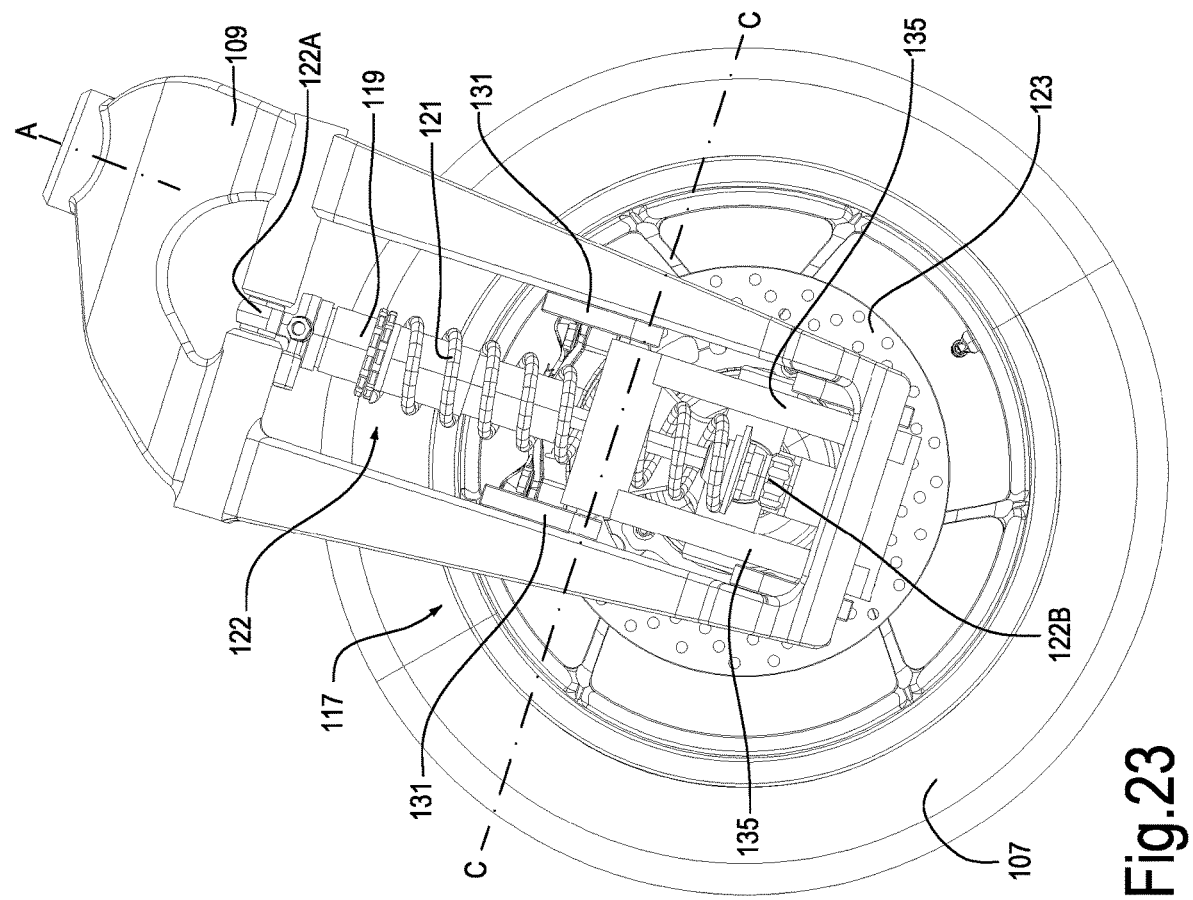
FIG. 23 shows a side view according to XXIII-XXIII of FIG. 22.
Figure 25:
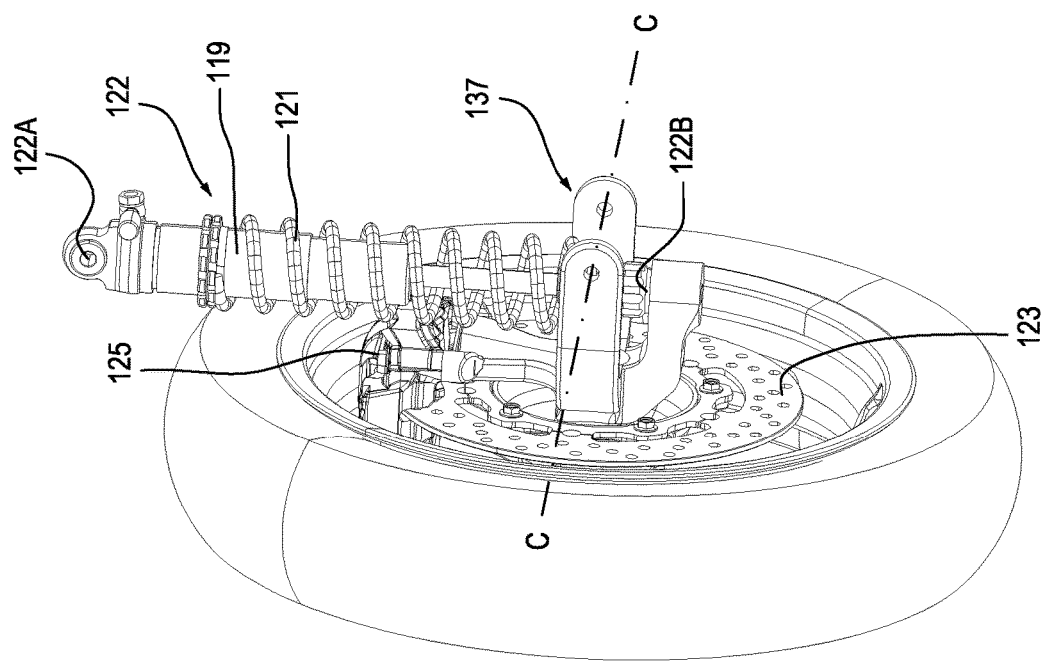
FIG. 25 shows the suspension of FIGS. 21, 22, 23 and 24 with the Watt four-bar linkage removed.
Figure 24:
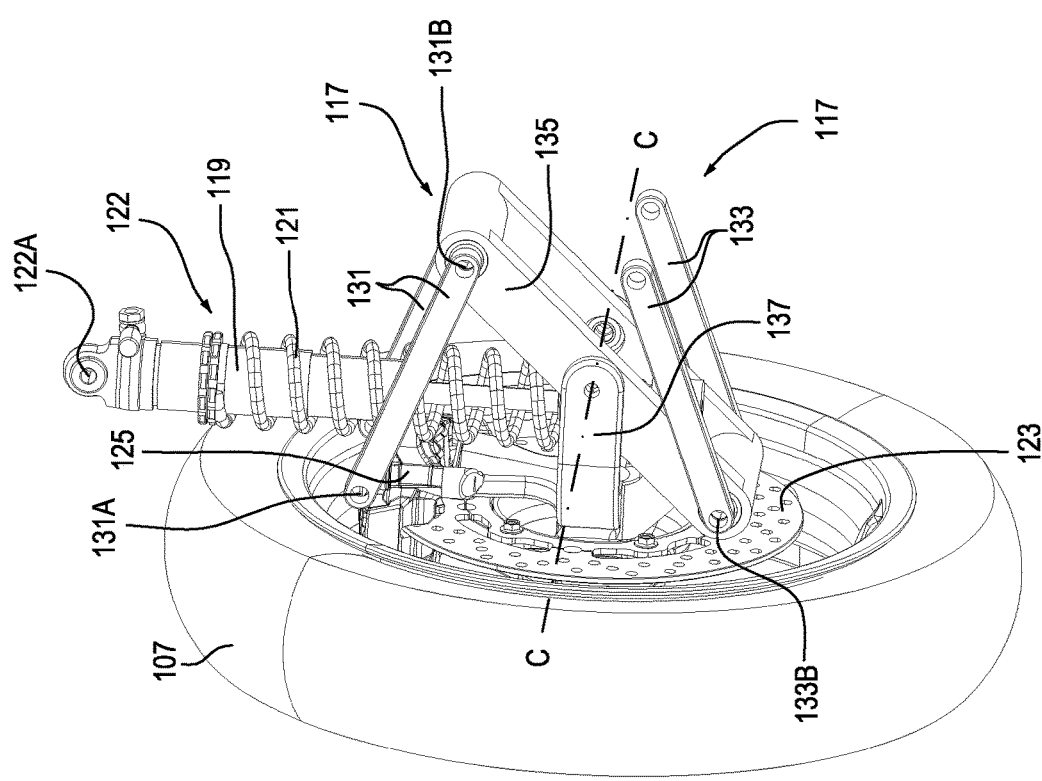
FIG. 24 shows the suspension of FIGS. 21, 22 and 23 without the rotatable arm with which the suspension connects the front steered wheel.

FIGS. 21, 22 and 23 show the assembly comprising the front steered wheel 107, the rotatable arm 109 with its steering axis A-A, and the suspension 117 with all the components. FIG. 24 shows the same assembly with the rotatable arm 109 removed and FIG. 25 illustrates the assembly from which the Watt four-bar linkage has also been removed to show the wheel support, the wheel, the shock absorber 122 with the brake or damper 119 and the spring 121.

More in particular, this embodiment is provided with a suspension 117 with a Watt four-bar linkage comprising: the rotatable arm 109, a first crank 131, a second crank 133 and a connecting rod 135. In practice, each crank 131, 133 is double. The two parts of each crank are located outside the connecting rod 135, positioned centrally.

The crank 131 is hinged by means of a first hinge 131A to the rotatable arm 109 and by means of a second hinge 131B to the connecting rod 135. Likewise, the crank 133 hinged by means of a first hinge 133A to the rotatable arm 109 and by means of a second hinge 133B to the connecting rod 135. The axes of the hinges 131A, 131B, 133A, 133B are parallel to each other and oriented at 90° with respect to the rotation axis B-B of the front steered wheel 107. The direction of orientation of the hinge axes of the Watt four-bar linkage is indicated with C-C in this embodiment, see in particular FIG. 23. In practice, the hinge axes of the four-bar linkage are oriented orthogonally to a plane containing the rotation axis B-B of the front steered wheel 107 and substantially parallel to the direction of the springing movement.

The cranks 131, 133 have substantially the same length. The connecting rod 135 is hinged in a median point between the axes of the hinges 131B, 133B to a wheel support 137. The wheel support 137 is hinged to the connecting rod 135 about a hinge axis oriented in the direction C-C, i.e., an axis parallel to the axes of the hinges of the Watt four-bar linkage. The hinge axis that joins the wheel support 137 and the connecting rod 135 intersects the rotation axis B-B of the front steered wheel and is orthogonal thereto.

In the illustrated embodiment, the wheel support 137 has a fork shape that surrounds the connecting rod 135, as shown in particular in FIGS. 24 and 25. The wheel support 137 can also have a constraint for connection to the shock absorber 122. In the embodiment illustrated in FIGS. 21 to 25, the constraint between the wheel support 137 and the shock absorber 122 is an interlocking joint.

The wheel support 137 forms the rotation seat of the axle of the front steered wheel 107, not shown in the figures.

As shown in particular in FIG. 21, the hinges 131B and 133A are on one side and the hinges 131A and 133B are on the other side of a plane orthogonal to the rotation axis B-B of the front steered wheel 107 and approximately parallel to the direction of the springing movement of the suspension 117. From a different viewpoint, the hinges 131B, 133A are on one side of a plane orthogonal to the rotation axis B-B of the front steered wheel 107, while the hinges 131A, 133B are on the other side of said plane. The reference plane can, for example, be a plane that, besides being orthogonal to the rotation axis B-B of the front steered wheel 7, passes through the hinge 122A connecting the shock absorber 122 and the arm 109, or a plane orthogonal to the rotation axis B-B of the front steered wheel and containing the hinge axis (oriented in the direction C-C) between the connecting rod 135 and the wheel support 137.

During the springing movement of the front steered wheel 107, the four-bar linkage of the suspension 117 deforms with a pivoting motion of the cranks 131, 133 with respect to the rotatable arm 109 and consequent pivoting motion of the connecting rod 135 about the hinge axis with which it is connected to the wheel support 137. The configuration of the Watt four-bar linkage formed of the components 109, 131, 133, 135 is also such that in the whole of the excursion of the springing movement the hinge between connecting rod 135 and wheel support 137, and therefore the hinge axis C-C, moves according to an approximately rectilinear trajectory. As the wheel support 137 is rigidly connected to the shock absorber 122, the oscillation of the connecting rod 135 has no effect on the camber angle of the front steered wheel 107.

Figure 26:
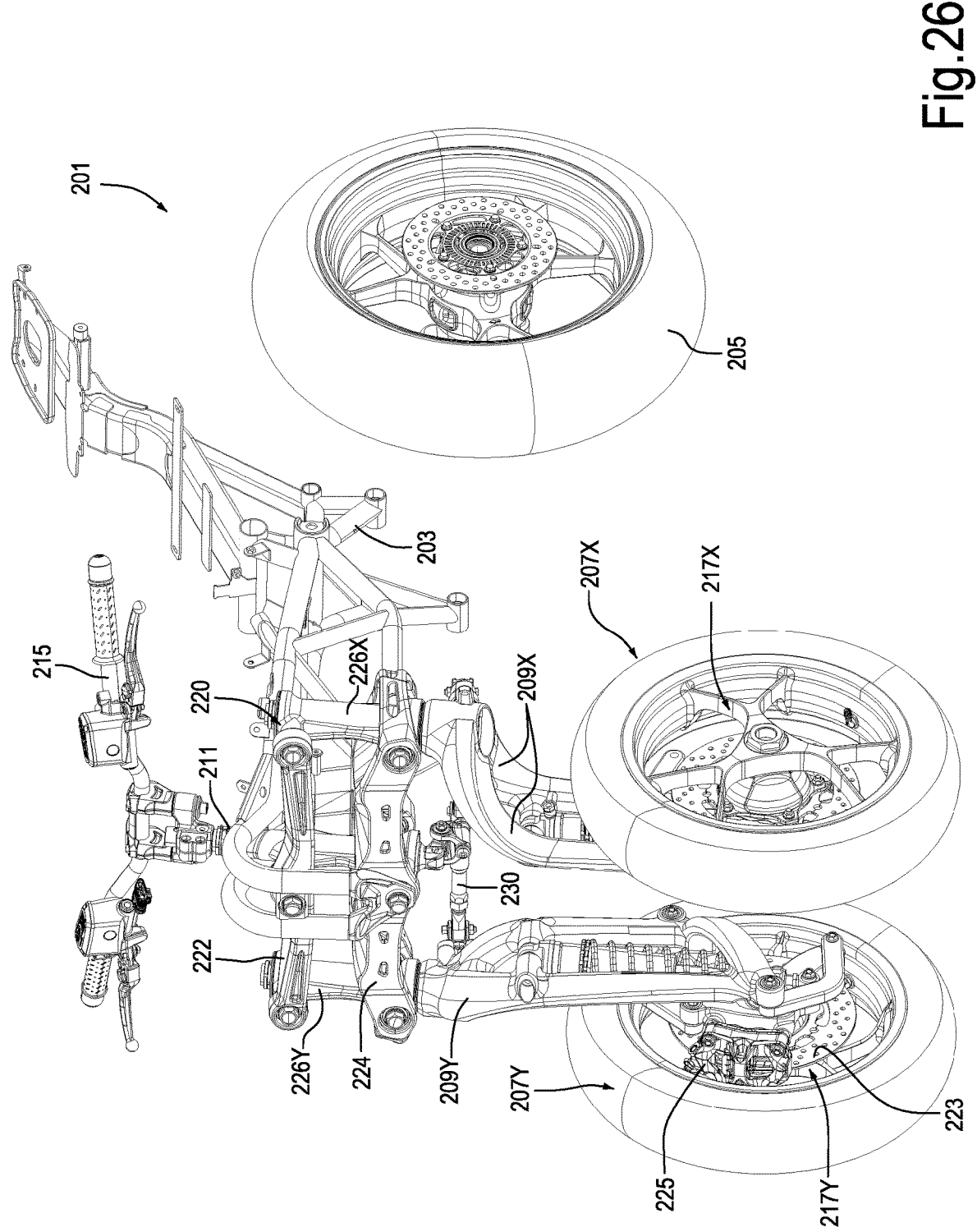
FIG. 26 shows an axonometric view of a three-wheeled motor vehicle with double Watt four-bar linkage suspension for the two front steered wheels.
Figure 27:
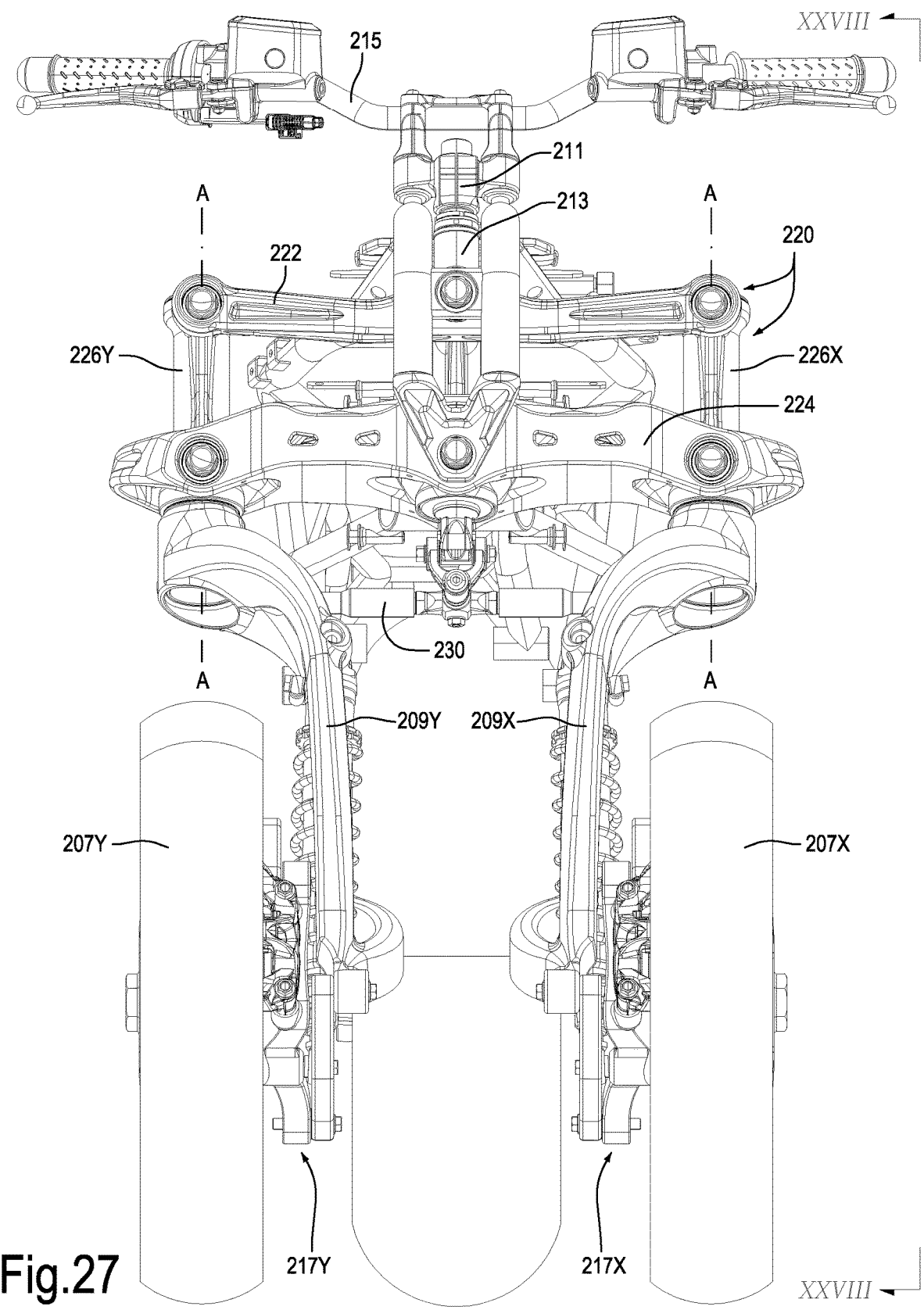
FIG. 27 shows a front view of the motor vehicle of FIG. 26.
Figure 28:
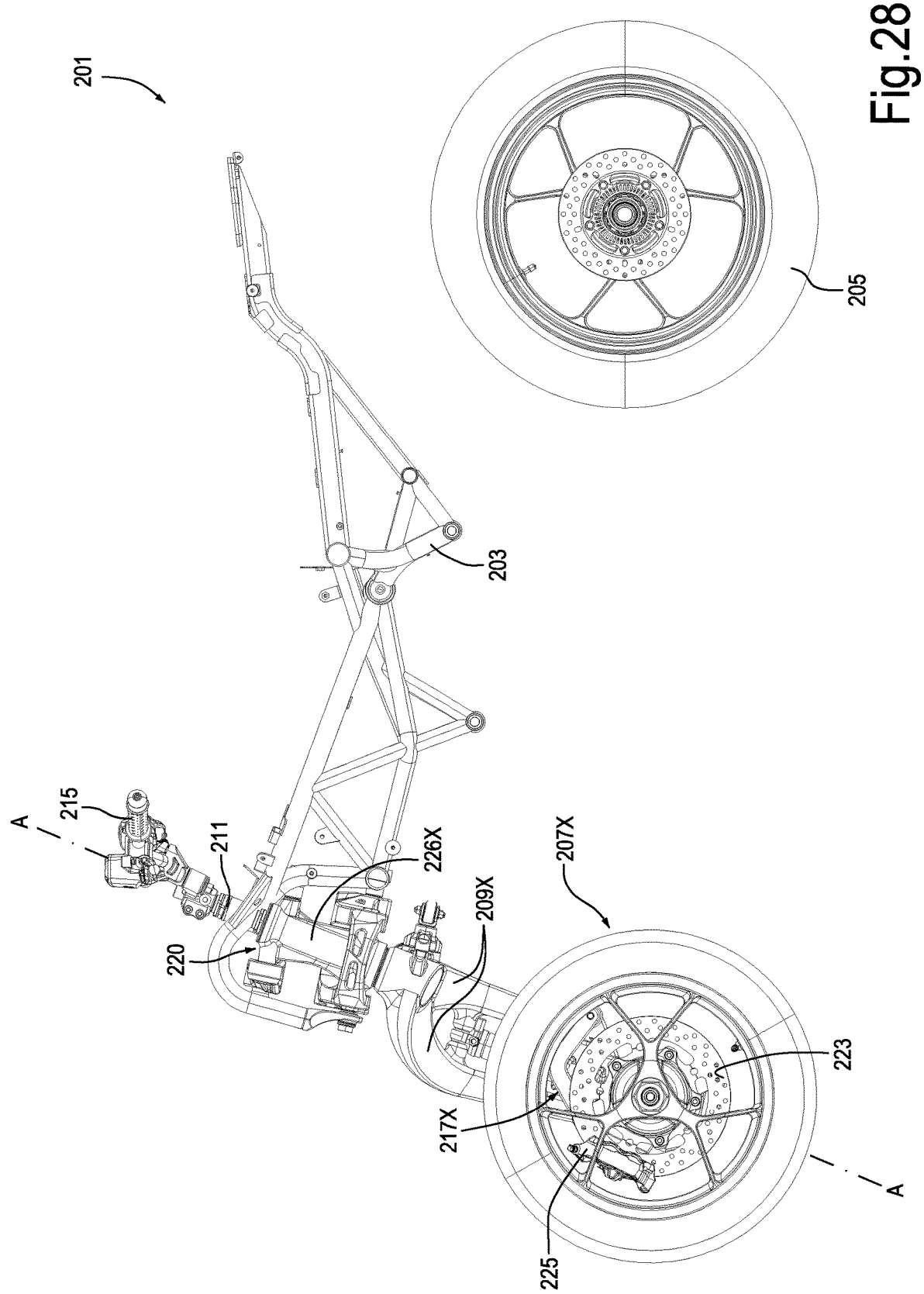
FIG. 28 shows a side view according to XXVIII-XXVIII of FIG. 27.

In the embodiments described above, reference has been made to a two-wheeled motor vehicle, with a single front steered wheel 7 or 107. However, the suspensions of the present disclosure can also be used in tilting saddle-riding vehicles with two front steered wheels, for example provided with one or two four-bar linkages adapted to ensure the rolling movement of the motor vehicle during travel. FIGS. 26 to 28 schematically illustrate a tilting saddle-riding motor vehicle 201 with frame 203, a rear driving wheel 205 and two front steered wheels 207X, 207Y, left and right respectively. The two front steered wheels 207X, 207Y are side by side in a transverse, i.e., right-left, direction, of the vehicle 201.

In the embodiment schematically illustrated in FIGS. 26, 27 and 28, the reference numbers 209X and 209Y indicated two rotatable arms, having the same function as the single rotatable arm 9, 109 described with reference to the preceding embodiments of motor vehicles with a single front steered wheel. Each rotatable arm 209X, 209Y is adapted to rotate about a steering axis A-A.

For this purpose, each rotatable arm 209X, 209Y is rotatably housed in a support or upright 226X, 226Y which is part of a rolling four-bar linkage 220. The two supports or uprights 226X, 22Y are connected to each other by respective upper and lower crosspieces 222 and 224. The crosspieces 222, 224 and the supports 226X, 226Y form the rolling four-bar linkage 220 and are hinged to each other about hinge axes parallel to each other and lying on planes oriented in the front-rear direction of the motor vehicle 201.

The reference number 215 indicates a handlebar, by means of which a steering movement is imparted about the axes A-A to the support arms 209X, 209Y by means of a steering column 211 that acts on a steering bar 230.

The rolling four-bar linkage mechanism described above is known per se and does not require a more detailed description.

Each front steered wheel 207X, 207Y is connected to its rotatable arm 209X, 209Y by means of a suspension 217X, 217Y that can be designed in any one of the manners described with reference to FIGS. 1 to 25. In FIGS. 26-28 the suspensions 217X, 217Y are configured as in FIGS. 1 to 6.

The invention claimed is:

1. A saddle-riding motor vehicle comprising:
at least one rear driving wheel;
at least a first front steered wheel;
a rotatable arm, the front steered wheel being connected to the rotatable arm, which is provided with a rotary motion about a steering axis;
a suspension comprising a shock absorber; and
a wheel support connected to the rotatable arm with the interposition of the suspension said wheel support supporting the front steered wheel and defining a rotation axis of said front steered wheel, wherein the suspension comprises a Watt four-bar linkage.

2. The motor vehicle of claim 1, wherein the Watt four-bar linkage comprises a first crank hinged with a first hinge to the rotatable arm and with a second hinge to a connecting rod of the Watt four-bar linkage, a second crank hinged with a first hinge to the rotatable arm and with a second hinge to the connecting rod; and wherein the wheel support is constrained in a constraining point of the connecting rod, such that the rotation axis of the front steered wheel is approximately equidistant from the second hinge of the first crank and from the second hinge of the second crank.

3. The motor vehicle of claim 2, wherein the wheel support is constrained to the connecting rod such that the rotation axis of the front steered wheel is parallel to axes of the first hinge and of the second hinge of the first crank and of the second crank.

4. The motor vehicle of claim 3, wherein the wheel support is rigidly connected to the connecting rod and forms a housing for a bearing supporting the front steered wheel.

5. The motor vehicle of claim 2, wherein the first hinge and the second hinge of the first crank and the first hinge and the second hinge of the second crank have axes parallel to the rotation axis of the front steered wheel.

6. The motor vehicle of claim 2, wherein the first hinge of the first crank and the second hinge of the second crank are on a first side of a plane containing the rotation axis of the front steered wheel and passing through a constraint point of the shock absorber to the rotatable arm; and wherein the second hinge of the first crank and the first hinge of the second crank are on a second side of said plane.

7. The motor vehicle of claim 2, wherein, with respect to the advancement direction of the vehicle:
the first hinge of the first crank and the second hinge of the second crank are in a backward position, and the second hinge of the first crank and the first hinge of the second crank are in a forward position; or
the first hinge of the first crank and the second hinge of the second crank are in a forward position, and the second hinge of the first crank and the first hinge of the second crank are in a backward position.

8. The motor vehicle of claim 2, wherein the first hinge and the second hinge of the first crank, and the first hinge and the second hinge of the second crank have axes substantially parallel to each other and orthogonal to a plane containing the rotation axis of the front steered wheel.

9. The motor vehicle of claim 8, wherein the first hinge of the first crank and the second hinge of the second crank are on a first side of a plane orthogonal to the rotation axis of the front steered wheel and passing through a constraint point of the shock absorber to the rotatable arm; and wherein the second hinge of the first crank and the first hinge of the second crank are on a second side of said plane.

10. The motor vehicle of claim 8, wherein the wheel support is hinged to the connecting rod around an axis substantially parallel to the axes of the first hinge and of the second hinge of the first crank and of the second crank.

11. The motor vehicle of claim 10, wherein the arrangement of the hinges of the Watt four-bar linkage with respect to a plane parallel to the plane in which the wheel lies and passing through the hinge axis between the wheel support and the connecting rod, is such that: the first hinge of the first crank and the second hinge of the second crank are on one side of such a plane, and the second hinge of the first crank and the first hinge of the second crank are on the other side of such a plane.

12. The motor vehicle of claim 10, wherein the wheel support supports the front steered wheel in such a position that the rotation axis of the front steered wheel is orthogonal to the axis around which the wheel support is hinged to the connecting rod.

13. The motor vehicle of claim 1, further comprising a disc brake, with a disc integral with the front steered wheel and a caliper, wherein said caliper is rigidly connected to the wheel support.

14. The motor vehicle of claim 1, further comprising a disc brake, with a disc integral with the front steered wheel and a caliper, wherein said caliper is rigidly connected to a support member mounted idle with respect to the connecting rod and to the wheel support.

15. The motor vehicle of claim 1, wherein the shock absorber is connected on one side to the rotatable arm and on the other side to a point rigidly connected to the connecting rod of the Watt four-bar linkage.

16. The motor vehicle of claim 1 wherein the shock absorber is connected on one side to the rotatable arm and on the other side to a point rigidly connected to the wheel support.

17. The motor vehicle of claim 1, wherein the shock absorber is connected on one side to the rotatable arm and on the other side to an axle of the front steered wheel, rotatably supported in the wheel support.

18. The motor vehicle of claim 1, wherein the shock absorber is connected on one side to the rotatable arm and on the other side to the connecting rod of the Watt four-bar linkage.

19. The motor vehicle of claim 1, further comprising a second front steered wheel which is connected to a second rotatable arm provided with a rotary movement about a second steering axis and is connected, with the interposition of a second suspension, to a wheel support of the second front steered wheel; wherein the second suspension comprises a shock absorber and a Watt four-bar linkage, substantially symmetrical to the Watt four-bar linkage of the suspension of the first front steered wheel with respect to a median plane of the motor vehicle; and wherein the first front steered wheel and the second front steered wheel are connected to the frame of the motor vehicle by means of a rolling four-bar linkage hinged to the frame.

20. The motor vehicle of claim 19, wherein the first rotatable arm, to which the first front steered wheel is connected, and the second rotatable arm, to which the second front steered wheel is connected, are rotatably supported in respective right and left uprights of the rolling four-bar linkage, the uprights being connected to each other by a first crosspiece and a second crosspiece, extending in right-left direction with respect to the median plane of the vehicle and hinged to the uprights.

* * * * *